US009751041B2

(12) United States Patent
Tammera

(10) Patent No.: US 9,751,041 B2
(45) Date of Patent: Sep. 5, 2017

(54) APPARATUS AND SYSTEM FOR SWING ADSORPTION PROCESSES RELATED THERETO

(71) Applicant: Robert F. Tammera, Warrenton, VA (US)

(72) Inventor: Robert F. Tammera, Warrenton, VA (US)

(73) Assignee: ExxonMobil Upstream Research Company, Spring, TX (US)

( * ) Notice: Subject to any disclaimer, the term of this patent is extended or adjusted under 35 U.S.C. 154(b) by 14 days.

(21) Appl. No.: 15/079,574

(22) Filed: Mar. 24, 2016

(65) Prior Publication Data

US 2016/0332106 A1    Nov. 17, 2016

Related U.S. Application Data

(60) Provisional application No. 62/162,216, filed on May 15, 2015.

(51) Int. Cl.
*B01D 53/04*      (2006.01)
*B01D 53/047*     (2006.01)

(52) U.S. Cl.
CPC ....... *B01D 53/047* (2013.01); *B01D 53/0446* (2013.01); *B01D 53/0462* (2013.01);
(Continued)

(58) Field of Classification Search
CPC ............ B01D 53/0446; B01D 53/0462; B01D 53/047; B01D 53/0473; B01D 2253/102;
(Continued)

(56) References Cited

U.S. PATENT DOCUMENTS

| 1,868,138 A | 7/1932 | Fisk |
| 3,103,425 A | 9/1963 | Meyer ............... 55/62 |

(Continued)

FOREIGN PATENT DOCUMENTS

| CA | 2297590 | 9/2000 | ........... B01D 53/047 |
| CA | 2297591 | 9/2000 | ............... F17D 1/02 |

(Continued)

OTHER PUBLICATIONS

Conviser, S. A. (1964) "Removal of $CO_2$ from Natural Gas With Molecular Sieves," *Proceedings of the Gas Conditioning Conf. Univ. of Oklahoma*, pp. 1F-12F.

(Continued)

*Primary Examiner* — Frank Lawrence
(74) *Attorney, Agent, or Firm* — ExxonMobil Upstream Research Company Law Department

(57) ABSTRACT

Provided are apparatus and systems having an adsorbent bed unit for use in a cyclical swing adsorption process. The process is utilized to remove contaminants from a gas feed streams. The adsorbent bed unit includes an assembly of thermal polygon contactors with each of the thermal polygon contactors having one or more internal channels and two or more of the thermal polygon contactors form one or more external channels. The external channels having adsorbent coating that is utilized to remove contaminants from a gas feed streams.

25 Claims, 14 Drawing Sheets

(52) U.S. Cl.
CPC .... *B01D 53/0473* (2013.01); *B01D 2253/102* (2013.01); *B01D 2253/104* (2013.01); *B01D 2253/106* (2013.01); *B01D 2253/108* (2013.01); *B01D 2253/204* (2013.01); *B01D 2253/342* (2013.01); *B01D 2256/24* (2013.01); *B01D 2257/304* (2013.01); *B01D 2257/504* (2013.01); *B01D 2259/40013* (2013.01); *B01D 2259/40028* (2013.01); *B01D 2259/40043* (2013.01); *B01D 2259/4062* (2013.01); *B01D 2259/40086* (2013.01)

(58) Field of Classification Search
CPC ........ B01D 2253/104; B01D 2253/106; B01D 2253/108; B01D 2253/204; B01D 2253/342; B01D 2256/24; B01D 2257/304; B01D 2257/504; B01D 2259/40013; B01D 2259/40028; B01D 2259/40043; B01D 2259/40086; B01D 2259/4062
USPC ....... 95/96–105, 114, 115; 96/108, 144, 146
See application file for complete search history.

(56) References Cited

U.S. PATENT DOCUMENTS

| | | | |
|---|---|---|---|
| 3,124,152 A | 3/1964 | Payne | 137/269.5 |
| 3,142,547 A | 7/1964 | Marsh et al. | 55/26 |
| 3,508,758 A | 4/1970 | Strub | 277/15 |
| 3,602,247 A | 8/1971 | Bunn et al. | 137/270 |
| 3,788,036 A | 1/1974 | Lee et al. | 55/25 |
| 3,967,464 A | 7/1976 | Cormier et al. | 62/13 |
| 4,165,569 A * | 8/1979 | Mackay | C01B 3/0005 34/416 |
| 4,187,092 A | 2/1980 | Woolley | 62/48 |
| 4,261,815 A | 4/1981 | Kelland | 209/213 |
| 4,324,565 A | 4/1982 | Benkmann | 55/23 |
| 4,325,565 A | 4/1982 | Winchell | 280/282 |
| 4,329,162 A | 5/1982 | Pitcher | 55/523 |
| 4,340,398 A | 7/1982 | Doshi et al. | 55/25 |
| 4,386,947 A | 6/1983 | Mizuno et al. | 55/387 |
| 4,445,441 A | 5/1984 | Tanca | 110/165 |
| 4,461,630 A | 7/1984 | Cassidy et al. | 55/25 |
| 4,496,376 A | 1/1985 | Hradek | 55/163 |
| 4,705,627 A | 11/1987 | Miwa et al. | 210/264 |
| 4,711,968 A | 12/1987 | Oswald et al. | 568/454 |
| 4,737,170 A | 4/1988 | Searle | 55/179 |
| 4,770,676 A | 9/1988 | Sircar et al. | 55/26 |
| 4,783,205 A | 11/1988 | Searle | 55/161 |
| 4,784,672 A | 11/1988 | Sircar | 55/26 |
| 4,790,272 A | 12/1988 | Woolenweber | 123/188 |
| 4,814,146 A | 3/1989 | Brand et al. | 422/179 |
| 4,816,039 A | 3/1989 | Krishnamurthy et al. | 55/26 |
| 4,877,429 A | 10/1989 | Hunter | 55/162 |
| 4,977,745 A | 12/1990 | Heichberger | 62/10 |
| 5,000,007 A * | 3/1991 | Haefner | F04B 37/08 417/901 |
| 5,110,328 A | 5/1992 | Yokota et al. | 55/180 |
| 5,125,934 A | 6/1992 | Krishnamurthy et al. | 55/25 |
| 5,169,006 A | 12/1992 | Stelzer | 209/223.1 |
| 5,174,796 A | 12/1992 | Davis et al. | 55/26 |
| 5,224,350 A | 7/1993 | Mehra | 62/17 |
| 5,234,472 A | 8/1993 | Krishnamurthy et al. | 95/98 |
| 5,292,990 A | 3/1994 | Kantner et al. | 585/820 |
| 5,306,331 A | 4/1994 | Auvil et al. | 95/42 |
| 5,354,346 A | 10/1994 | Kumar | 95/101 |
| 5,365,011 A | 11/1994 | Ramachandran et al. | 585/829 |
| 5,370,728 A | 12/1994 | LaSala et al. | 95/101 |
| 5,447,558 A | 9/1995 | Acharya | |
| 5,547,641 A | 8/1996 | Smith et al. | 422/181 |
| 5,565,018 A | 10/1996 | Baksh et al. | 95/100 |
| 5,672,196 A | 9/1997 | Acharya et al. | 95/97 |
| 5,700,310 A | 12/1997 | Bowman et al. | 95/45 |
| 5,733,451 A | 3/1998 | Coellner et al. | 210/496 |
| 5,735,938 A | 4/1998 | Baksh et al. | 95/101 |
| 5,750,026 A | 5/1998 | Gadkaree et al. | 201/502.1 |
| 5,766,311 A | 6/1998 | Ackley et al. | |
| 5,792,239 A | 8/1998 | Reinhold, III et al. | 95/101 |
| 5,807,423 A | 9/1998 | Lemcoff et al. | 95/96 |
| 5,811,616 A | 9/1998 | Holub et al. | 585/504 |
| 5,827,358 A | 10/1998 | Kulish et al. | 96/115 |
| 5,906,673 A | 5/1999 | Reinhold, III et al. | 95/45 |
| 5,924,307 A | 7/1999 | Nenov | 62/643 |
| 5,930,910 A | 8/1999 | Trapp et al. | |
| 5,935,444 A | 8/1999 | Johnson et al. | 210/691 |
| 5,968,234 A | 10/1999 | Midgett, II et al. | 95/120 |
| 5,976,221 A | 11/1999 | Bowman et al. | 95/45 |
| 5,997,617 A | 12/1999 | Czabala et al. | 96/130 |
| 6,007,606 A | 12/1999 | Baksh et al. | 95/98 |
| 6,011,192 A | 1/2000 | Baker et al. | 585/818 |
| 6,023,942 A | 2/2000 | Thomas et al. | 62/613 |
| 6,053,966 A | 4/2000 | Moreau et al. | 95/96 |
| 6,063,161 A | 5/2000 | Keefer et al. | 95/100 |
| 6,099,621 A | 8/2000 | Ho | 95/139 |
| 6,129,780 A | 10/2000 | Millet et al. | 95/117 |
| 6,136,222 A | 10/2000 | Friesen et al. | 252/184 |
| 6,147,126 A | 11/2000 | DeGeorge et al. | 518/715 |
| 6,171,371 B1 | 1/2001 | Derive et al. | 95/98 |
| 6,176,897 B1 | 1/2001 | Keefer | 95/98 |
| 6,179,900 B1 | 1/2001 | Behling et al. | 95/45 |
| 6,194,079 B1 | 2/2001 | Hekal | 428/566 |
| 6,210,466 B1 | 4/2001 | Whysall et al. | 95/100 |
| 6,231,302 B1 | 5/2001 | Bonardi | 415/105 |
| 6,245,127 B1 | 6/2001 | Kane et al. | 95/101 |
| 6,284,021 B1 | 9/2001 | Lu et al. | 95/96 |
| 6,311,719 B1 | 11/2001 | Hill et al. | 137/312 |
| 6,345,954 B1 | 2/2002 | Al-Himyary et al. | 415/112 |
| 6,398,853 B1 | 6/2002 | Keefer et al. | 96/125 |
| 6,402,813 B2 | 6/2002 | Monereau et al. | 95/96 |
| 6,406,523 B1 | 6/2002 | Connor et al. | 96/125 |
| 6,432,379 B1 | 8/2002 | Heung | 423/648.1 |
| 6,436,171 B1 | 8/2002 | Wang et al. | 95/96 |
| 6,444,012 B1 | 9/2002 | Dolan et al. | 95/99 |
| 6,444,014 B1 | 9/2002 | Mullhaupt et al. | 95/130 |
| 6,444,523 B1 | 9/2002 | Fan et al. | 438/257 |
| 6,451,095 B1 | 9/2002 | Keefer et al. | 96/125 |
| 6,457,485 B2 | 10/2002 | Hill et al. | 137/240 |
| 6,471,939 B1 | 10/2002 | Boix et al. | 423/706 |
| 6,488,747 B1 | 12/2002 | Keefer | 96/125 |
| 6,497,750 B2 | 12/2002 | Butwell et al. | 95/96 |
| 6,500,241 B2 | 12/2002 | Reddy | 96/134 |
| 6,500,404 B1 | 12/2002 | Camblor Fernandez et al. | 423/706 |
| 6,503,299 B2 | 1/2003 | Baksh et al. | 95/98 |
| 6,506,351 B1 | 1/2003 | Jain et al. | 423/239.1 |
| 6,514,318 B2 | 2/2003 | Keefer | 95/96 |
| 6,514,319 B2 | 2/2003 | Keefer et al. | 95/101 |
| 6,517,609 B1 | 2/2003 | Monereau et al. | 95/96 |
| 6,531,516 B2 | 3/2003 | Davis et al. | 518/700 |
| 6,533,846 B1 | 3/2003 | Keefer et al. | 96/125 |
| 6,565,627 B1 | 5/2003 | Golden et al. | 95/96 |
| 6,565,635 B2 | 5/2003 | Keefer et al. | 96/125 |
| 6,565,825 B2 | 5/2003 | Ohji et al. | 423/625 |
| 6,572,678 B1 | 6/2003 | Wijmans et al. | 95/47 |
| 6,579,341 B2 | 6/2003 | Baker et al. | 95/39 |
| 6,593,541 B1 | 7/2003 | Herren | 219/121.67 |
| 6,595,233 B2 | 7/2003 | Pulli | 137/115.05 |
| 6,605,136 B1 | 8/2003 | Graham et al. | 95/98 |
| 6,607,584 B2 | 8/2003 | Moreau et al. | 95/117 |
| 6,630,012 B2 | 10/2003 | Wegeng et al. | 95/106 |
| 6,631,626 B1 | 10/2003 | Hahn | 62/612 |
| 6,641,645 B1 | 11/2003 | Lee et al. | 95/98 |
| 6,651,645 B1 | 11/2003 | Nunez-Suarez | |
| 6,660,064 B2 | 12/2003 | Golden et al. | 95/96 |
| 6,660,065 B2 | 12/2003 | Byrd et al. | 95/117 |
| 6,692,626 B2 | 2/2004 | Keefer et al. | 204/491 |
| 6,712,087 B2 | 3/2004 | Hill et al. | 137/240 |
| 6,742,507 B2 | 6/2004 | Keefer et al. | 123/585 |
| 6,746,515 B2 | 6/2004 | Wegeng et al. | 95/96 |
| 6,752,852 B1 | 6/2004 | Jacksier et al. | 95/117 |
| 6,770,120 B2 | 8/2004 | Neu et al. | 95/96 |
| 6,773,225 B2 | 8/2004 | Yuri et al. | 415/1 |
| 6,802,889 B2 | 10/2004 | Graham et al. | 95/96 |

(56) References Cited

U.S. PATENT DOCUMENTS

| | | | |
|---|---|---|---|
| 6,814,771 B2 | 11/2004 | Scardino et al. | 55/385.3 |
| 6,835,354 B2 | 12/2004 | Woods et al. | 422/139 |
| 6,840,985 B2 | 1/2005 | Keefer | 96/125 |
| 6,866,950 B2 | 3/2005 | Connor et al. | 429/13 |
| 6,889,710 B2 | 5/2005 | Wagner | 137/625.46 |
| 6,890,376 B2 | 5/2005 | Arquin et al. | 96/134 |
| 6,893,483 B2 | 5/2005 | Golden et al. | 95/96 |
| 6,902,602 B2 | 6/2005 | Keefer et al. | 95/97 |
| 6,916,358 B2 | 7/2005 | Nakamura et al. | 95/96 |
| 6,918,953 B2 | 7/2005 | Lomax, Jr. et al. | 96/130 |
| 6,921,597 B2 | 7/2005 | Keefer et al. | 429/34 |
| 6,974,496 B2 | 12/2005 | Wegeng et al. | 96/126 |
| 7,025,801 B2 | 4/2006 | Monereau | 95/8 |
| 7,027,929 B2 | 4/2006 | Wang | 702/17 |
| 7,029,521 B2 | 4/2006 | Johansson | 96/128 |
| 7,074,323 B2 | 7/2006 | Ghijsen | 208/101 |
| 7,077,891 B2 | 7/2006 | Jaffe et al. | 96/108 |
| 7,087,331 B2 | 8/2006 | Keefer et al. | 429/17 |
| 7,094,275 B2 | 8/2006 | Keefer et al. | 96/125 |
| 7,097,925 B2 | 8/2006 | Keefer et al. | 429/9 |
| 7,112,239 B2 | 9/2006 | Kimbara et al. | 96/108 |
| 7,117,669 B2 | 10/2006 | Kaboord et al. | 60/288 |
| 7,128,775 B2 | 10/2006 | Celik et al. | 95/96 |
| 7,144,016 B2 | 12/2006 | Gozdawa | 277/399 |
| 7,160,356 B2 | 1/2007 | Koros et al. | 95/50 |
| 7,160,367 B2 | 1/2007 | Babicki et al. | 96/116 |
| 7,166,149 B2 | 1/2007 | Dunne et al. | 95/113 |
| 7,172,645 B1 | 2/2007 | Pfister et al. | 95/116 |
| 7,189,280 B2 | 3/2007 | Alizadeh-Khiavi et al. | 95/130 |
| 7,250,073 B2 | 7/2007 | Keefer et al. | 95/96 |
| 7,250,074 B2 | 7/2007 | Tonkovich et al. | 95/130 |
| 7,255,727 B2 | 8/2007 | Monereau et al. | 95/96 |
| 7,258,725 B2 | 8/2007 | Ohmi et al. | 95/41 |
| 7,276,107 B2 | 10/2007 | Baksh et al. | 95/96 |
| 7,279,029 B2 | 10/2007 | Occhialini et al. | 96/121 |
| 7,285,350 B2 | 10/2007 | Keefer et al. | 429/34 |
| 7,297,279 B2 | 11/2007 | Johnson et al. | 210/669 |
| 7,311,763 B2 | 12/2007 | Neary | 96/121 |
| RE40,006 E | 1/2008 | Keefer et al. | 95/100 |
| 7,314,503 B2 | 1/2008 | Landrum et al. | 95/50 |
| 7,354,562 B2 | 4/2008 | Ying et al. | 423/437.2 |
| 7,387,849 B2 | 6/2008 | Keefer et al. | 429/34 |
| 7,390,350 B2 | 6/2008 | Weist, Jr. et al. | 95/100 |
| 7,404,846 B2 | 7/2008 | Golden et al. | 95/103 |
| 7,449,049 B2 | 11/2008 | Thomas et al. | 95/123 |
| 7,456,131 B2 | 11/2008 | Klett et al. | 502/417 |
| 7,510,601 B2 | 3/2009 | Whitley et al. | 96/121 |
| 7,527,670 B2 | 5/2009 | Ackley et al. | 95/96 |
| 7,553,568 B2 | 6/2009 | Keefer | 429/13 |
| 7,578,864 B2 | 8/2009 | Watanabe et al. | 55/523 |
| 7,604,682 B2 | 10/2009 | Seaton | 95/96 |
| 7,637,989 B2 | 12/2009 | Bong | 96/130 |
| 7,641,716 B2 | 1/2010 | Lomax, Jr. et al. | 95/96 |
| 7,645,324 B2 | 1/2010 | Rode et al. | 95/96 |
| 7,651,549 B2 | 1/2010 | Whitley | 95/96 |
| 7,674,319 B2 | 3/2010 | Lomax, Jr. et al. | 95/19 |
| 7,674,539 B2 | 3/2010 | Keefer et al. | 429/17 |
| 7,687,044 B2 | 3/2010 | Keefer et al. | 422/211 |
| 7,713,333 B2 | 5/2010 | Rege et al. | 95/96 |
| 7,717,981 B2 | 5/2010 | LaBuda et al. | 95/96 |
| 7,722,700 B2 | 5/2010 | Sprinkle | 95/22 |
| 7,731,782 B2 | 6/2010 | Kelley et al. | 95/139 |
| 7,740,687 B2 | 6/2010 | Reinhold, III | 95/96 |
| 7,744,676 B2 | 6/2010 | Leitmayr et al. | 95/99 |
| 7,744,677 B2 | 6/2010 | Barclay et al. | 95/114 |
| 7,758,051 B2 | 7/2010 | Roberts-Haritonov et al. | 277/401 |
| 7,758,988 B2 | 7/2010 | Keefer et al. | 429/34 |
| 7,763,098 B2 | 7/2010 | Alizadeh-Khiavi et al. | 95/96 |
| 7,763,099 B2 | 7/2010 | Verma et al. | 95/96 |
| 7,792,983 B2 | 9/2010 | Mishra et al. | 709/231 |
| 7,806,965 B2 | 10/2010 | Stinson | 95/187 |
| 7,819,948 B2 | 10/2010 | Wagner | 95/100 |
| 7,828,877 B2 | 11/2010 | Sawada et al. | 95/96 |
| 7,828,880 B2 | 11/2010 | Moriya et al. | 95/210 |
| 7,854,793 B2 | 12/2010 | Rarig et al. | 96/116 |
| 7,858,169 B2 | 12/2010 | Yamashita | 428/116 |
| 7,862,645 B2 | 1/2011 | Whitley et al. | 95/96 |
| 7,867,320 B2 | 1/2011 | Baksh et al. | 95/96 |
| 7,938,886 B2 | 5/2011 | Hershkowitz et al. | 95/115 |
| 7,947,118 B2 | 5/2011 | Rarig et al. | 95/98 |
| 7,947,120 B2 | 5/2011 | Deckman et al. | 95/139 |
| 7,959,720 B2 | 6/2011 | Deckman et al. | 96/130 |
| 8,016,918 B2 | 9/2011 | LaBuda et al. | 95/96 |
| 8,034,164 B2 | 10/2011 | Lomax, Jr. et al. | 95/121 |
| 8,071,063 B2 | 12/2011 | Reyes et al. | 423/248 |
| 8,128,734 B2 | 3/2012 | Song | 95/96 |
| 8,142,745 B2 | 3/2012 | Reyes et al. | 423/213.2 |
| 8,142,746 B2 | 3/2012 | Reyes et al. | 423/213.2 |
| 8,192,709 B2 | 6/2012 | Reyes et al. | 423/245.1 |
| 8,210,772 B2 | 7/2012 | Gillecriosd | 405/128.2 |
| 8,227,121 B2 | 7/2012 | Adams et al. | 429/429 |
| 8,262,773 B2 | 9/2012 | Northrop et al. | 95/114 |
| 8,262,783 B2 | 9/2012 | Stoner et al. | 96/108 |
| 8,268,043 B2 | 9/2012 | Celik et al. | 95/96 |
| 8,268,044 B2 | 9/2012 | Wright et al. | 95/96 |
| 8,272,401 B2 | 9/2012 | McLean | 137/625.11 |
| 8,287,629 B2 | 10/2012 | Fujita et al. | 96/126 |
| 8,319,090 B2 | 11/2012 | Kitamura | 136/244 |
| 8,337,594 B2 | 12/2012 | Corma Canos et al. | 95/130 |
| 8,361,200 B2 | 1/2013 | Sayari et al. | 95/139 |
| 8,361,205 B2 | 1/2013 | Desai et al. | 96/121 |
| 8,377,173 B2 | 2/2013 | Chuang | 95/135 |
| 8,444,750 B2 | 5/2013 | Deckman et al. | 95/96 |
| 8,470,395 B2 | 6/2013 | Khiavi et al. | 427/180 |
| 8,480,795 B2 | 7/2013 | Siskin et al. | 95/235 |
| 8,512,569 B2 | 8/2013 | Eaton et al. | 210/650 |
| 8,518,356 B2 | 8/2013 | Schaffer et al. | 423/220 |
| 8,529,662 B2 | 9/2013 | Kelley et al. | 95/96 |
| 8,529,663 B2 | 9/2013 | Reyes et al. | 95/96 |
| 8,529,664 B2 | 9/2013 | Deckman et al. | 95/96 |
| 8,529,665 B2 | 9/2013 | Manning et al. | 95/96 |
| 8,535,414 B2 | 9/2013 | Johnson et al. | 95/95 |
| 8,545,602 B2 | 10/2013 | Chance et al. | 95/96 |
| 8,551,444 B2 | 10/2013 | Agnihotri et al. | 423/648.1 |
| 8,573,124 B2 | 11/2013 | Havran et al. | 102/206 |
| 8,591,627 B2 | 11/2013 | Jain | 95/52 |
| 8,591,634 B2 | 11/2013 | Winchester et al. | 96/127 |
| 8,616,233 B2 | 12/2013 | McLean et al. | 137/246.22 |
| 8,657,922 B2 | 2/2014 | Yamawaki et al. | 95/96 |
| 8,673,059 B2 | 3/2014 | Leta et al. | 95/104 |
| 8,715,617 B2 | 5/2014 | Genkin et al. | 423/652 |
| 8,752,390 B2 | 6/2014 | Wright et al. | 60/780 |
| 8,778,051 B2 | 7/2014 | Weist, Jr. et al. | 95/98 |
| 8,784,533 B2 | 7/2014 | Leta et al. | 95/97 |
| 8,784,534 B2 | 7/2014 | Kamakoti et al. | 95/97 |
| 8,784,535 B2 | 7/2014 | Ravikovitch et al. | 95/98 |
| 8,795,411 B2 | 8/2014 | Hufton et al. | 95/90 |
| 8,808,425 B2 | 8/2014 | Genkin et al. | 95/96 |
| 8,808,426 B2 | 8/2014 | Sundaram | 95/96 |
| 8,814,985 B2 | 8/2014 | Gerds et al. | 95/90 |
| 8,852,322 B2 | 10/2014 | Gupta et al. | 95/136 |
| 8,858,683 B2 | 10/2014 | Deckman | 95/96 |
| 8,875,483 B2 | 11/2014 | Wettstein | 60/39.52 |
| 8,906,138 B2 | 12/2014 | Rasmussen et al. | 95/96 |
| 8,921,637 B2 | 12/2014 | Sundaram et al. | 585/823 |
| 8,939,014 B2 | 1/2015 | Kamakoti et al. | 73/38 |
| 9,005,561 B2 | 4/2015 | Leta | |
| 9,017,457 B2 | 4/2015 | Tammera | 95/96 |
| 9,028,595 B2 | 5/2015 | Sundaram et al. | |
| 9,034,078 B2 | 5/2015 | Wanni et al. | 95/8 |
| 9,034,079 B2 | 5/2015 | Deckman et al. | 95/96 |
| 9,067,168 B2 | 6/2015 | Frederick et al. | 96/108 |
| 9,095,809 B2 | 8/2015 | Deckman et al. | 95/45 |
| 9,108,145 B2 | 8/2015 | Kalbassi et al. | 95/8 |
| 9,120,049 B2 | 9/2015 | Sundaram et al. | 96/121 |
| 9,126,138 B2 | 9/2015 | Deckman et al. | 95/95 |
| 9,162,175 B2 | 10/2015 | Sundaram | 96/121 |
| 9,168,485 B2 | 10/2015 | Deckman et al. | 95/96 |
| 2001/0047824 A1 | 12/2001 | Hill et al. | 137/312 |
| 2002/0124885 A1 | 9/2002 | Hill et al. | 137/312 |
| 2002/0162452 A1 | 11/2002 | Butwell et al. | 95/96 |
| 2003/0075485 A1 | 4/2003 | Ghijsen | 208/308 |
| 2003/0129101 A1 | 7/2003 | Zettel | 422/179 |

(56) References Cited

U.S. PATENT DOCUMENTS

| | | | |
|---|---|---|---|
| 2003/0131728 A1 | 7/2003 | Kanazirev et al. | 95/96 |
| 2003/0170527 A1 | 9/2003 | Finn et al. | 429/34 |
| 2003/0202918 A1 | 10/2003 | Ashida et al. | 422/180 |
| 2003/0205130 A1 | 11/2003 | Neu et al. | 95/90 |
| 2003/0223856 A1 | 12/2003 | Yuri et al. | 415/1 |
| 2004/0099142 A1 | 5/2004 | Arquin et al. | 96/134 |
| 2004/0197596 A1 | 10/2004 | Connor et al. | 428/630 |
| 2004/0232622 A1 | 11/2004 | Gozdawa | 277/401 |
| 2005/0109419 A1 | 5/2005 | Ohmi et al. | 141/4 |
| 2005/0114032 A1 | 5/2005 | Wang | 702/14 |
| 2005/0129952 A1 | 6/2005 | Sawada et al. | 428/409 |
| 2005/0145111 A1 | 7/2005 | Keefer et al. | 96/124 |
| 2005/0150378 A1 | 7/2005 | Dunne et al. | 95/113 |
| 2005/0229782 A1 | 10/2005 | Monereau et al. | 95/96 |
| 2005/0252378 A1 | 11/2005 | Celik et al. | 96/121 |
| 2006/0048648 A1 | 3/2006 | Gibbs et al. | 96/108 |
| 2006/0049102 A1 | 3/2006 | Miller et al. | 210/500.27 |
| 2006/0076270 A1 | 4/2006 | Poshusta et al. | 208/208 |
| 2006/0099096 A1 | 5/2006 | Shaffer et al. | 418/55.1 |
| 2006/0105158 A1 | 5/2006 | Fritz et al. | 428/317.9 |
| 2006/0162556 A1 | 7/2006 | Ackley et al. | 95/96 |
| 2006/0165574 A1 | 7/2006 | Sayari | 423/210 |
| 2006/0169142 A1 | 8/2006 | Rode et al. | 96/129 |
| 2006/0236862 A1 | 10/2006 | Golden et al. | 95/96 |
| 2007/0084241 A1 | 4/2007 | Kretchmer et al. | 63/29.2 |
| 2007/0084344 A1 | 4/2007 | Moriya et al. | 95/210 |
| 2007/0222160 A1 | 9/2007 | Roberts-Haritonov et al. | 277/387 |
| 2007/0253872 A1 | 11/2007 | Keefer et al. | 422/143 |
| 2007/0261557 A1 | 11/2007 | Gadkaree et al. | 96/121 |
| 2007/0283807 A1 | 12/2007 | Whitley | 95/96 |
| 2008/0051279 A1 | 2/2008 | Klett et al. | 502/60 |
| 2008/0072822 A1 | 3/2008 | White | 118/722 |
| 2008/0128655 A1 | 6/2008 | Garg et al. | 252/373 |
| 2008/0282883 A1 | 11/2008 | Rarig et al. | 95/96 |
| 2008/0282884 A1 | 11/2008 | Kelley et al. | 95/96 |
| 2008/0282885 A1 | 11/2008 | Deckman et al. | 95/98 |
| 2008/0282886 A1 | 11/2008 | Reyes et al. | 95/98 |
| 2008/0282887 A1 | 11/2008 | Chance | 95/98 |
| 2008/0282892 A1 | 11/2008 | Deckman et al. | 96/140 |
| 2008/0289497 A1 | 11/2008 | Barclay et al. | 95/114 |
| 2008/0307966 A1 | 12/2008 | Stinson | 95/187 |
| 2008/0314550 A1 | 12/2008 | Greco | 165/4 |
| 2009/0004073 A1 | 1/2009 | Gleize et al. | 422/180 |
| 2009/0014902 A1 | 1/2009 | Koivunen et al. | 265/11 |
| 2009/0025553 A1 | 1/2009 | Keefer et al. | 95/96 |
| 2009/0037550 A1 | 2/2009 | Mishra et al. | 708/208 |
| 2009/0071333 A1 | 3/2009 | LaBuda et al. | 95/96 |
| 2009/0079870 A1 | 3/2009 | Matsui | 348/558 |
| 2009/0107332 A1 | 4/2009 | Wagner | 95/100 |
| 2009/0151559 A1 | 6/2009 | Verma et al. | 95/96 |
| 2009/0162268 A1 | 6/2009 | Hufton et al. | 423/210 |
| 2009/0180423 A1 | 7/2009 | Kroener | 370/328 |
| 2009/0241771 A1 | 10/2009 | Manning et al. | 95/15 |
| 2009/0284013 A1 | 11/2009 | Anand et al. | |
| 2009/0308248 A1 | 12/2009 | Siskin et al. | 95/236 |
| 2009/0314159 A1 | 12/2009 | Haggerty | 95/90 |
| 2010/0059701 A1 | 3/2010 | McLean | 251/304 |
| 2010/0077920 A1 | 4/2010 | Baksh et al. | 95/97 |
| 2010/0089241 A1 | 4/2010 | Stoner et al. | 96/125 |
| 2010/0186445 A1 | 7/2010 | Minta et al. | 62/606 |
| 2010/0212493 A1 | 8/2010 | Rasmussen et al. | 95/45 |
| 2010/0251887 A1 | 10/2010 | Jain | 95/46 |
| 2010/0252497 A1 | 10/2010 | Ellison et al. | 210/500.1 |
| 2010/0263534 A1 | 10/2010 | Chuang | 95/139 |
| 2010/0282593 A1 | 11/2010 | Speirs et al. | 203/11 |
| 2010/0288704 A1 | 11/2010 | Amsden et al. | 210/688 |
| 2010/0326272 A1* | 12/2010 | Asaro | B01D 53/0407 95/11 |
| 2011/0002818 A1 | 1/2011 | Tonkovich et al. | |
| 2011/0031103 A1 | 2/2011 | Deckman et al. | 203/41 |
| 2011/0067440 A1 | 3/2011 | Van Aken | 62/613 |
| 2011/0067770 A1 | 3/2011 | Pederson et al. | 137/625.15 |
| 2011/0146494 A1 | 6/2011 | Desai et al. | 96/115 |
| 2011/0217218 A1 | 9/2011 | Gupta et al. | 423/228 |
| 2011/0277620 A1 | 11/2011 | Havran et al. | 89/1.14 |
| 2011/0291051 A1 | 12/2011 | Hershkowitz et al. | 252/373 |
| 2011/0296871 A1 | 12/2011 | Van Soest-Vercammen et al. | 62/636 |
| 2011/0308524 A1 | 12/2011 | Brey et al. | 128/205.12 |
| 2012/0024152 A1 | 2/2012 | Yamawaki et al. | 95/96 |
| 2012/0031144 A1 | 2/2012 | Northrop et al. | 62/617 |
| 2012/0067216 A1 | 3/2012 | Corma-Canos et al. | 95/95 |
| 2012/0152115 A1 | 6/2012 | Gerds et al. | 95/90 |
| 2012/0222551 A1 | 9/2012 | Deckman | 95/96 |
| 2012/0222552 A1 | 9/2012 | Ravikovitch et al. | 95/97 |
| 2012/0222553 A1 | 9/2012 | Kamakoti et al. | 95/99 |
| 2012/0222554 A1 | 9/2012 | Leta et al. | 95/104 |
| 2012/0222555 A1 | 9/2012 | Gupta et al. | 95/136 |
| 2012/0255377 A1 | 10/2012 | Kamakoti et al. | 73/863.23 |
| 2012/0308456 A1 | 12/2012 | Leta et al. | 423/228 |
| 2012/0312163 A1 | 12/2012 | Leta et al. | 95/97 |
| 2013/0061755 A1 | 3/2013 | Frederick et al. | 96/110 |
| 2013/0068101 A1 | 3/2013 | Knapp et al. | |
| 2013/0225898 A1 | 8/2013 | Sundaram et al. | 585/802 |
| 2014/0013955 A1 | 1/2014 | Tammera et al. | 96/115 |
| 2014/0060326 A1 | 3/2014 | Sundaram et al. | 95/96 |
| 2014/0157986 A1 | 6/2014 | Ravikovitch et al. | 95/96 |
| 2014/0208797 A1 | 7/2014 | Kelley et al. | 62/611 |
| 2014/0216254 A1 | 8/2014 | Tammera et al. | 95/114 |
| 2014/0271394 A1 | 9/2014 | Jiang et al. | |
| 2015/0196870 A1 | 7/2015 | Albright et al. | |

FOREIGN PATENT DOCUMENTS

| | | | |
|---|---|---|---|
| CA | 2224471 | 10/2000 | B01D 53/047 |
| CA | 2234924 | 12/2001 | B01D 53/047 |
| CA | 2237103 | 12/2001 | B01D 53/047 |
| CA | 2228206 | 1/2002 | B01D 53/047 |
| CA | 2357356 | 11/2005 | B01D 53/047 |
| CA | 2616701 | 2/2007 | B01D 53/14 |
| CA | 2423178 | 4/2013 | B01D 15/000 |
| DE | 102009003610 | 11/2009 | F01D 15/10 |
| EP | 0225736 | 6/1987 | B01D 53/04 |
| EP | 0257493 | 2/1988 | B01D 53/04 |
| EP | 0262934 | 4/1988 | B01D 53/04 |
| EP | 0426937 | 5/1991 | B01D 53/04 |
| EP | 1004341 | 5/2000 | B01D 53/047 |
| EP | 1018359 | 7/2000 | B01D 53/047 |
| EP | 1413348 | 8/2002 | B01D 53/04 |
| EP | 1 459 799 | 9/2004 | |
| EP | 1577561 | 9/2005 | F04D 29/10 |
| EP | 1203610 | 12/2005 | B01D 53/053 |
| EP | 1674555 | 6/2006 | B01D 53/04 |
| EP | 1798197 | 6/2007 | C01B 21/04 |
| EP | 1045728 | 11/2009 | B01D 53/00 |
| EP | 2823872 | 1/2015 | B01D 53/047 |
| FR | 2924951 | 6/2009 | B01D 53/52 |
| GB | 2013101 | 8/1979 | B01D 53/04 |
| JP | 58-114715 | 7/1983 | B01D 53/20 |
| JP | 59-232174 | 12/1984 | C10K 1/32 |
| JP | 60-189318 | 12/1985 | |
| JP | 2002-253818 | 10/1990 | |
| JP | 04-180978 | 6/1992 | C09J 5/00 |
| JP | 2011-169640 | 6/1999 | B01D 53/04 |
| JP | 2011-280921 | 10/1999 | F16K 1/00 |
| JP | 2000-024445 | 8/2001 | B32B 25/08 |
| JP | 2002-348651 | 12/2002 | C23C 2/06 |
| JP | 2006-016470 | 1/2006 | B01D 46/30 |
| JP | 2006-036849 | 2/2006 | C10L 3/10 |
| JP | 2008-272534 | 11/2008 | B01D 53/04 |
| WO | WO99/43418 | 9/1999 | B01D 53/53 |
| WO | WO00/35560 | 6/2000 | B01D 53/47 |
| WO | WO02/24309 | 3/2002 | B01D 53/06 |
| WO | WO02/073728 | 9/2002 | H01M 8/06 |
| WO | WO03/031328 | 4/2003 | C01B 13/02 |
| WO | WO2005/032694 | 4/2005 | B01D 53/04 |
| WO | WO2005/070518 | 8/2005 | B01D 53/06 |
| WO | WO2005/090793 | 9/2005 | F04D 29/10 |
| WO | WO2006/017940 | 2/2006 | B01J 8/02 |
| WO | WO2006/074343 | 7/2006 | B01D 53/02 |
| WO | WO2007/111738 | 10/2007 | F25J 3/08 |
| WO | WO2008/143967 | 11/2008 | B01D 53/04 |
| WO | WO2009/003171 | 12/2008 | B01D 53/02 |

(56) References Cited

FOREIGN PATENT DOCUMENTS

| WO | WO2009/003174 | 12/2008 | ............ B01D 53/02 |
|----|---------------|---------|----------------------|
| WO | WO2010/081809 | 7/2010  | ............ B01D 53/04 |
| WO | WO2010/123598 | 10/2010 | ............... C10L 3/10 |
| WO | WO2011/139894 | 11/2011 | ............ B01D 53/47 |

OTHER PUBLICATIONS

ExxonMobil Research and Engineering and Xebec (2008) RCPSA—Rapid Cycle Pressure Swing Adsorption—An Advanced, Low-Cost Commercialized H2 Recovery Process, *Brochure*, 2 pages.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Farooq, S. et al. (1990) "Continuous Contercurrent Flow Model for a Bulk PSA Separation Process," *AIChE J.*, v36 (2) p. 310-314.

FlowServe (2005)"Exceeding Expectations, US Navy Cuts Maintenance Costs With Flowserve GX-200 Non-Contacting Seal Retrofits," *Face-to-Face*, v17.1.

GE Oil & Gas (2007) "Dry Gas Seal Retrofit," Florene, Italy, www.ge.com/oilandgas. 4 pgs.

Hopper, B. et al. (2008) "World's First 10,000 psi Sour Gas Injection Compressor," *Proceedings of the 37th Turbomachinery Symosium*, pp. 73-95.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Rameshni, Mahin "Strategies for Sour Gas Field Developments," *Worley Parsons—Brochure*, 20 pgs.

Reyes, S. C. et al. (1997) "Frequency Modulation Methods for Diffusion and Adsorption Measurements in Porous Solids," *J. Phys. Chem. B.* v101, pp. 614-622.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Realiability in Centrifugal Compressors," *Dresser-Rand, Tech. Paper* 134, 15 pages.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

\* cited by examiner

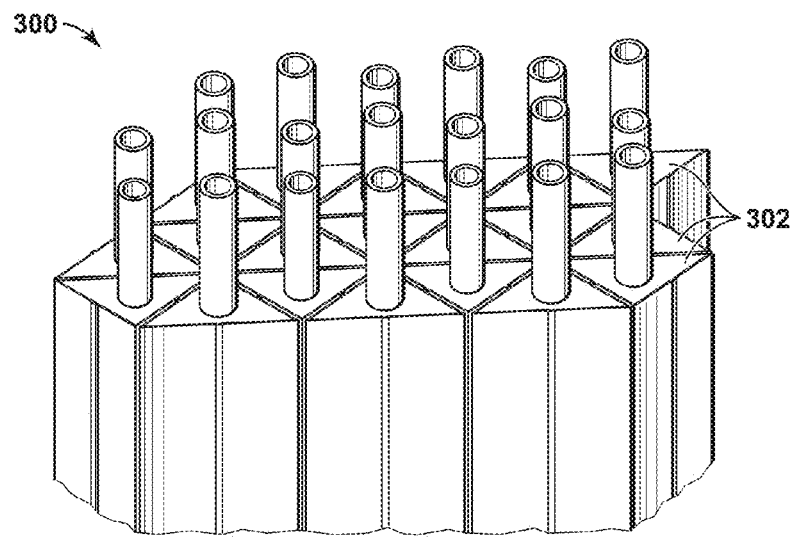
FIG. 3A
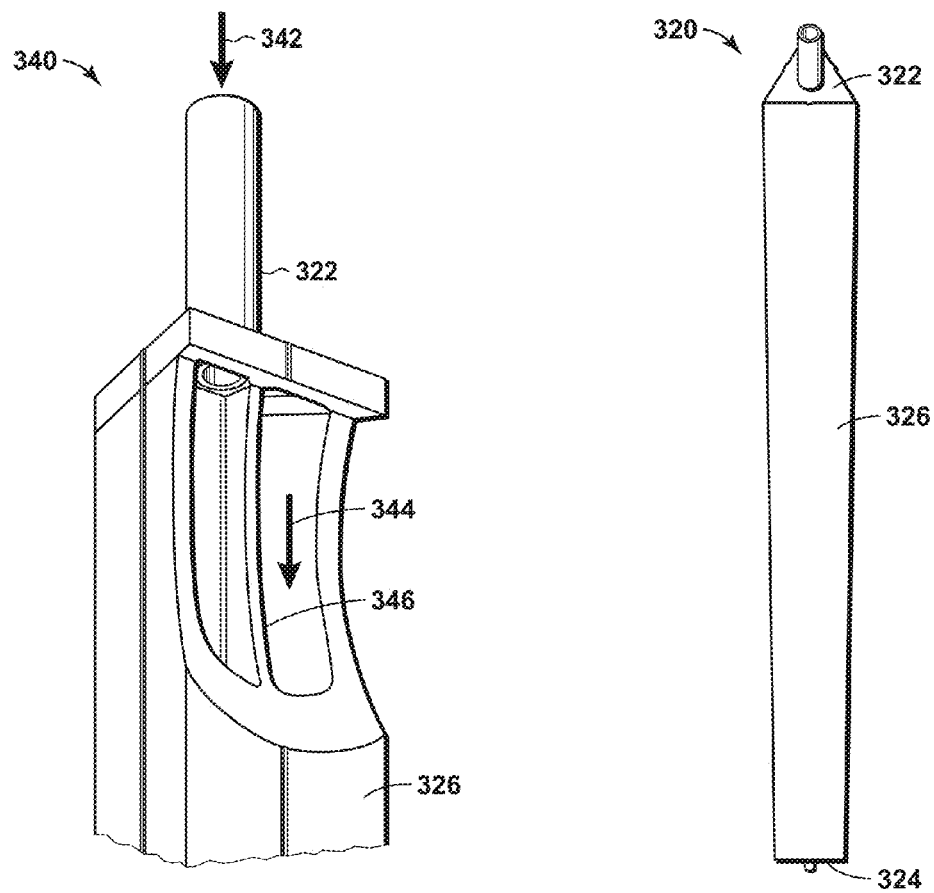
FIG. 3C  FIG. 3B

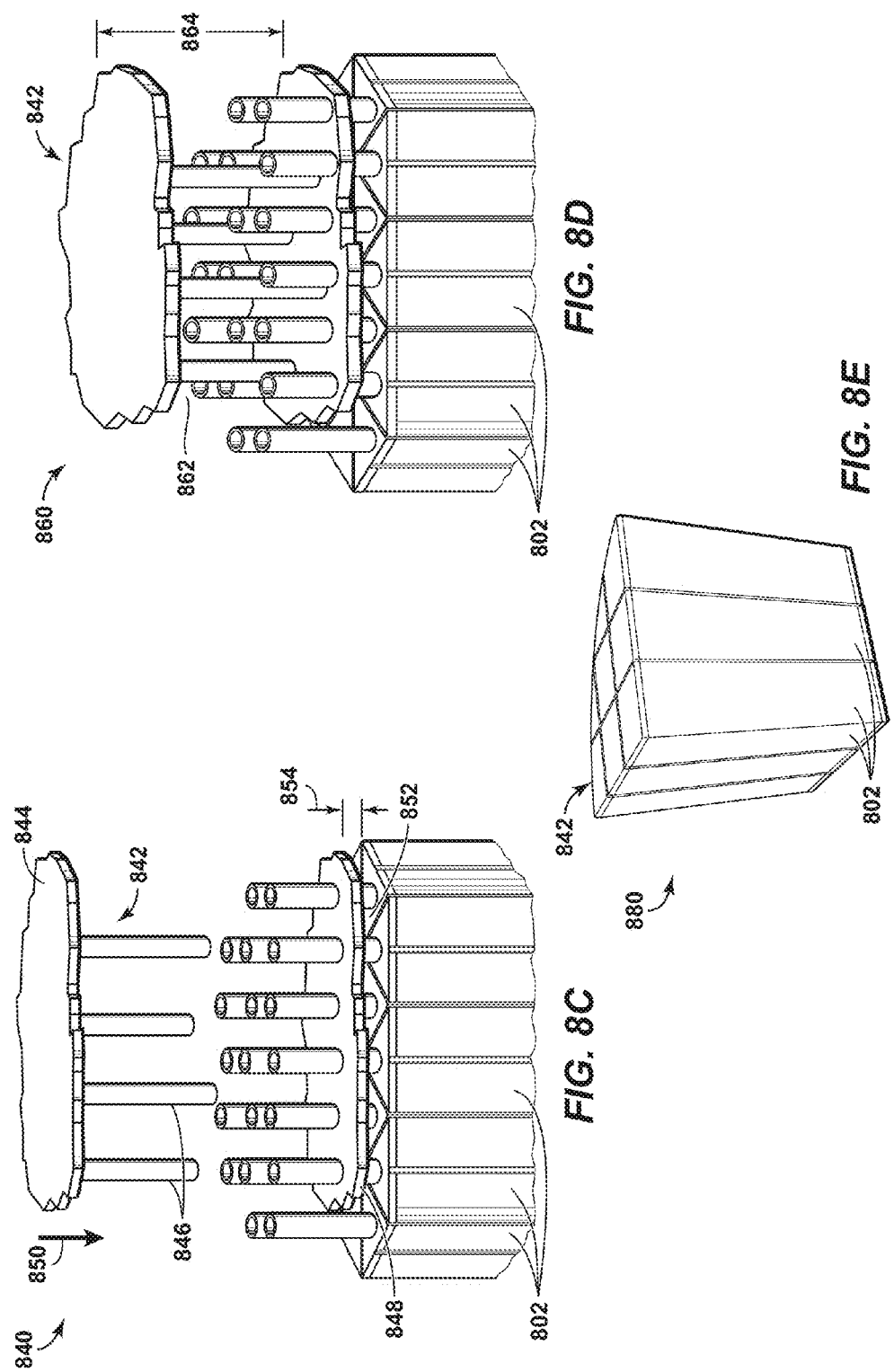

APPARATUS AND SYSTEM FOR SWING ADSORPTION PROCESSES RELATED THERETO

CROSS REFERENCE TO RELATED APPLICATIONS

This application claims the priority benefit of U.S. Patent Application 62/162,216 filed May 15, 2015 entitled APPARATUS AND SYSTEM FOR SWING ADSORPTION PROCESSES RELATED THERETO, the entirety of which is incorporated by reference herein.

FIELD

The present techniques relate to a system associated with a swing adsorption process. In particular, the system includes an adsorbent bed unit whose configuration includes a ridged thermal contactor.

BACKGROUND

Gas separation is useful in many industries and can typically be accomplished by flowing a mixture of gases over an adsorbent material that preferentially adsorbs one or more gas components while not adsorbing one or more other gas components. The non-adsorbed components are recovered as a separate product.

One particular type of gas separation technology is swing adsorption, such as temperature swing adsorption (TSA), pressure swing adsorption (PSA), partial pressure swing adsorption (PPSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated by reducing the pressure, thereby releasing the adsorbed carbon dioxide. The adsorbent material is then typically purged and repressurized. Then, the adsorbent material is ready for another adsorption cycle.

The swing adsorption processes typically involve adsorption units, which include adsorbent bed assemblies. These adsorbent bed units utilize different packing material in the bed structures. For example, the adsorbent bed units utilize checker brick, pebble beds or other available packing. As an enhancement, some adsorbent bed units may utilize engineered packing within the bed structure. The engineered packing may include a material provided in a specific configuration, such as a honeycomb, ceramic foams or the like.

Further, various adsorbent bed assemblies may be coupled together with conduits and valves to manage the flow of fluids. Orchestrating these adsorbent bed assemblies involves coordinating the cycles for each of the adsorbent bed assemblies with other adsorbent bed assemblies in the system. A complete cycle can vary from seconds to minutes as it transfers a plurality of gaseous streams through one or more of the adsorbent bed assemblies.

Unfortunately, conventional swing adsorption processes have certain limitations that lessen efficiencies in performing cyclical operations. That is, the conventional systems do not provide adequate surface area for the adsorption of contaminates. This aspect is further complicated for rapid cycle swing adsorption processes.

Accordingly, it is desirable to provide an enhanced method and apparatus to implement an industrial-scale, adsorber, which increases the surface area and maximize gas channels (e.g., enhance the micro-gas channel to surface area ratio). The present techniques provide a method and apparatus that overcome one or more of the deficiencies discussed above.

SUMMARY OF THE INVENTION

In one or more embodiments, an adsorbent bed unit for a cyclical swing process is described. The comprising a housing having an interior region; an assembly of thermal polygon contactors disposed in the interior region, each of the thermal polygon contactors having one or more internal channels within each of the thermal polygon contactors and one or more external channels formed between two or more of the thermal polygon contactors in the assembly of thermal polygon contactors, wherein at least one external surface for each of the thermal polygon contactors has an adsorbent coating; and wherein the adsorbent bed unit is configured to isolate direct fluid communication between fluids in the one or more internal channels and fluids in the one or more external channels. One or more spacing elements associated with the thermal polygon contactors may be used to provide structural support for a portion of the one or more external channels.

Further, in one or more embodiments, a method of manufacturing an adsorbent bed unit is described. The method of manufacturing may include fabricating a plurality of thermal polygon contactors, wherein each of the plurality of thermal polygon contactors comprises one or more internal channels within each of the thermal polygon contactors and wherein at least one external surfaces for each of the thermal polygon contactors has an adsorbent coating; securing two or more of the plurality of thermal polygon contactors to each other to form an assembly of thermal polygon contactors, wherein one or more external channels are formed between two or more of the thermal polygon contactors; constructing an adsorbent bed unit housing, wherein the an adsorbent bed unit housing has an interior region; and disposing the assemble of contactors into an adsorbent bed unit housing. Further, the one or more internal channels and the one or more external channels may be configured to provide substantially parallel and isolated fluid flow along the axial length of the thermal polygon contactors.

Moreover, in one or more embodiments, a cyclical swing adsorption process for removing contaminants from gas feed streams is described. The method may include passing a gaseous feed stream through an adsorbent bed unit having an assembly of thermal polygon contactors to separate one or more contaminants from the gaseous feed stream to form a product stream, wherein the assembly of thermal polygon contactors have one or more internal channels within each of the thermal polygon contactors and one or more external channels formed between two or more of the thermal polygon contactors in the assembly of thermal polygon contactors, wherein at least one external surface for each of the thermal polygon contactors have an adsorbent coating; and wherein the adsorbent bed unit is configured to isolate direct fluid communication between fluids in the one or more internal channels and fluids in the one or more external channels; interrupting the flow of the gaseous feed stream; performing a depressurization step, wherein the depressurization step reduces the pressure within the adsorbent bed unit; performing a purge step, wherein the purge step reduces the pressure within the adsorbent bed unit and wherein the purge step involves passing a purge stream to a through one or more of the external channels; performing a re-pressurization step, wherein the re-pressurization step increases the pressure within the adsorbent bed unit ; and repeating the steps a) to e) for at least one additional cycle, wherein the gaseous feed stream and the purge stream are passed through the one or more external passages and one or more of the steps a) to e) are performed while a fluid is passed through the one or more internal channels to manage the temperature adsorbent coating during the respective step.

Further, in certain embodiments, a feed distribution component or product distribution component may be utilized. The feed distribution component may be coupled to one or more of the thermal polygon contactors and is configured to: provide fluid communication between a feed secondary fluid zone and the one or more internal channels; provide fluid communication between a feed primary fluid zone and the one or more external channels; and isolate direct fluid communication between the one or more external channels and the one or more internal channels. The product distribution component coupled to one or more of the thermal polygon contactors, wherein the product distribution component is configured to: provide fluid communication between a product secondary fluid zone and the one or more internal channels; provide fluid communication between a product primary fluid zone and the one or more external channels; and isolate direct fluid communication between the one or more external channels and the one or more internal channels.

Yet further still, certain embodiments may manage the ratio of the internal channels and the external channels. For example, the one or more internal channels and the one or more external channels may be configured to have a ratio of total internal channels area to total external channels area in the range between 0.5 and 3.0, or in the range between 0.8 and 1.2.

BRIEF DESCRIPTION OF THE FIGURES

The foregoing and other advantages of the present disclosure may become apparent upon reviewing the following detailed description and drawings of non-limiting examples of embodiments.

FIGS. 3A, 3B and 3C are diagrams of an exemplary assembly of polygon thermal contactors in accordance with an embodiment of the present techniques.

FIGS. 8A, 8B, 8C, 8D and 8E are diagrams of fabrication steps for an assembly of polygon thermal contactors in accordance with an embodiment of the present techniques.

DETAILED DESCRIPTION OF THE INVENTION

Figure 1:
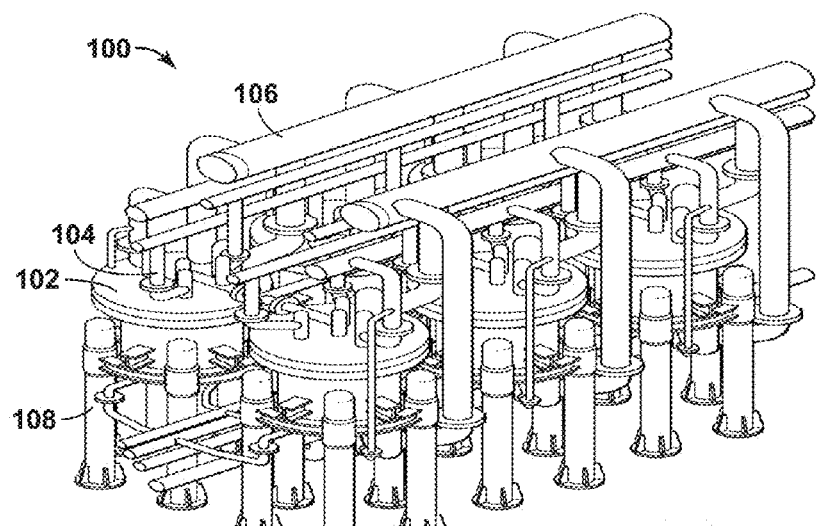
FIG. 1 is a three-dimensional diagram of the swing adsorption system with six adsorbent bed units and interconnecting piping in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

The present techniques relate to a polygon thermal contactor for use in an adsorbent bed unit. The polygon thermal contactor supports an exterior 100 to 200 micron adsorbent coating, which also includes one or more internal fluid passages or channels (e.g., liquids). The internal passages may be used to transfer a uniform temperature profile, which is configured to adjust the thermal surface of the applied coating. The polygon thermal contactor may have a single point of entry and discharge for the internal fluids, which provides a uniform fluid volume (e.g., liquid volume) that may adjust the temperature of one or more of the surfaces of the polygon thermal contactor (e.g., wall). In this configuration, the fluid may travel substantially parallel to the axial length of the given polygon thermal contactor.

Accordingly, each of the polygon thermal contactors may be configured to be integrated with other polygon thermal contactors to form an assembly of polygon thermal contactors. The assembly of polygon thermal contactors provides external fluid passages that are formed between at least two of the polygon thermal contactors. As an example, each of the polygon thermal contactors may be configured to be stacked with or adjacent to at least one other polygon thermal contactor, which may have similar dimensions and provide a uniform adsorbent passages or channels along all non-touching surfaces (e.g., gas channels). The adsorbent channels may provide a region for fluids passing through the external passages (e.g., gas channels) to interact with the adsorbent coating on the external portion of the respective polygon thermal contactors. Similar to the internal passages, the external passages or channels may have a single point of entry and discharge for the fluids, which provides a uniform fluid volume that may adjust the temperature of the one or more of the surfaces of the polygon thermal contactor (e.g., wall). In this configuration, the fluid may travel parallel to the axial length of the respective polygon thermal contactor and parallel with the flow of the fluid through the internal channel of the respective polygon thermal contactor.

Further, one or more of polygon thermal contactors in the assembly of polygon thermal contactors may include one or more components to manage fluid distribution. For example, at one end of the polygon thermal contactor a feed distribution component may be coupled to the polygon thermal contactor, while the other end of the polygon thermal contactor may be coupled to a product distribution component. The feed distribution component and product distribution component may be configured to isolate the fluids from the external channels into a primary fluid zone and the fluids from the internal channels into a secondary fluid zone. In addition, the feed distribution component and product distribution component may be configured to fluidly communicate with one of the polygon thermal contactors of the assembly of polygon thermal contactors or two or more of the polygon thermal contactors of the assembly of polygon thermal contactors.

For example, various similar dimensioned thermal contactors may be configured to communicate fluids with manifolds in a swing adsorption process, such as feed and product manifolds, which may be arranged in a pressure vessel as sub-assemblies. The independent sub-assemblies may operate in parallel and may provide a systematic mechanism for controlling the temperature treated liquid. The architecture can be fabricated in metal from and extruded dye or a mold. The material can be either plastic or ceramic, which may use known fabrication techniques.

In one or more embodiments, the present techniques can be used for any type of swing adsorption process. Non-limiting swing adsorption processes for which the present invention can be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes, such as pressure/temperature swing adsorption. Exemplary kinetic swing adsorption processes are described in U.S. Pat. Nos. 7,959,720, 8,545,602, 8,529,663, 8,444,750, and 8,529,662 which are each herein incorporated by reference in their entirety.

The present techniques provide various enhancements to swing adsorption systems. These enhancements may be utilized to provide an enhanced method and apparatus to implement an industrial-scale adsorber, which has an adsorbent bed unit that enhances the operation in a swing adsorption process. The present techniques provide an apparatus, method, and system that enhance the adsorbent bed configuration by managing the surface area and gas channels. That is, the adsorbent bed unit enhances the micro-gas channel to surface area ratio, which enhances the swing adsorption process.

Further, the configuration of the adsorbent bed unit may manage the total liquid area (e.g., total internal channels area) as compared with the total gaseous area (e.g., total external channels area). The ratio of the total internal channels area to the total external channels area may be in the range between 0.5 and 3.0, between 0.7 and 2.0 or between 0.8 and 1.2.

As an example, in certain embodiments, the internal passages or channels may be used to pass a liquid stream through one or more polygon thermal contactors in an assembly of polygon thermal contactors. The external passages formed by two or more of the polygon thermal contactors in an assembly of polygon thermal contactors may be used to pass a gaseous stream, which may interact with the adsorbent coating. In this configuration, the liquid may be used to heat or cool the polygon thermal contactors in the assembly of polygon thermal contactors and the associated adsorbent coating. The adsorbent coating on the external surface of the polygon thermal contactors may be used to remove contaminates from the gaseous stream. In this configuration, the liquid stream and the gaseous streams may travel parallel to the axial length of the given polygon thermal contactor and the liquid stream and the gaseous stream may travel substantially parallel with respect to each other (e.g., in the same direction or counter current direction). Beneficially, the liquid in the internal passages may be used to transfer a uniform temperature profile that may enhance the swing adsorption process using this configuration. Further, by having the channel areas balanced, the thermal effect is useful to manage the swing adsorption process.

Alternatively, in certain embodiments, the adsorbent coating may be disposed on the internal passages. For example, the internal passages or channels may be used to pass a gaseous stream through one or more polygon thermal contactors in an assembly of polygon thermal contactors. The external passages formed by two or more of the polygon thermal contactors in an assembly of polygon thermal contactors may be used to pass a liquid stream. In this configuration, the liquid may be used to heat or cool the polygon thermal contactors in the assembly of polygon thermal contactors, while the adsorbent coating on the internal surface of the polygon thermal contactors may be used to remove contaminates from the gaseous stream. The liquid stream in the external passages may be used to transfer a uniform temperature profile that may enhance the swing adsorption process using the assembly of polygon thermal contactors. In this configuration, the liquid stream and the gaseous streams may travel parallel to the axial length of the given polygon thermal contactor and the liquid stream and the gaseous stream may travel substantially parallel with respect to each other (e.g., in the same direction or counter current direction). The present techniques may be further understood with reference to the FIGS. 1 to 11C below.

FIG. 1 is a three-dimensional diagram of the swing adsorption system 100 having six adsorbent bed units and interconnecting piping. This configuration broadly relates to adsorbent bed units that can be deployed in a symmetrical orientation, as shown, or non-symmetrical orientation and/or combination thereof. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from gas feed streams. For example, the adsorbent bed unit 102 may include various conduits (e.g., conduit 104) for managing the flow of fluids through, to or from the adsorbent bed within the adsorbent bed unit 102. These conduits from the adsorbent bed units may be coupled to a manifold (e.g., manifold 106) to distribute the flow to, from or between components. The adsorbent bed may separate one or more contaminants from the gaseous feed stream to form a product stream. As may be appreciated, the adsorbent bed units may include other conduits to control other fluid steams as part of the process, such as purge streams, depressurizations streams, heating or cooling streams and the like. Further, the adsorbent bed unit may also include one or more equalization vessels, such as equalization vessel 108, which are dedicated to the adsorbent bed unit and may be dedicated to one or more step in the process.

As an example, which is discussed further below in FIG. 2, the adsorbent bed unit 102 may include housing, which may include a head portion and other body portions, that forms a substantially gas impermeable partition, an adsorbent bed disposed within the housing and a plurality of valves (e.g., poppet valves) providing flow paths through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifold or header. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
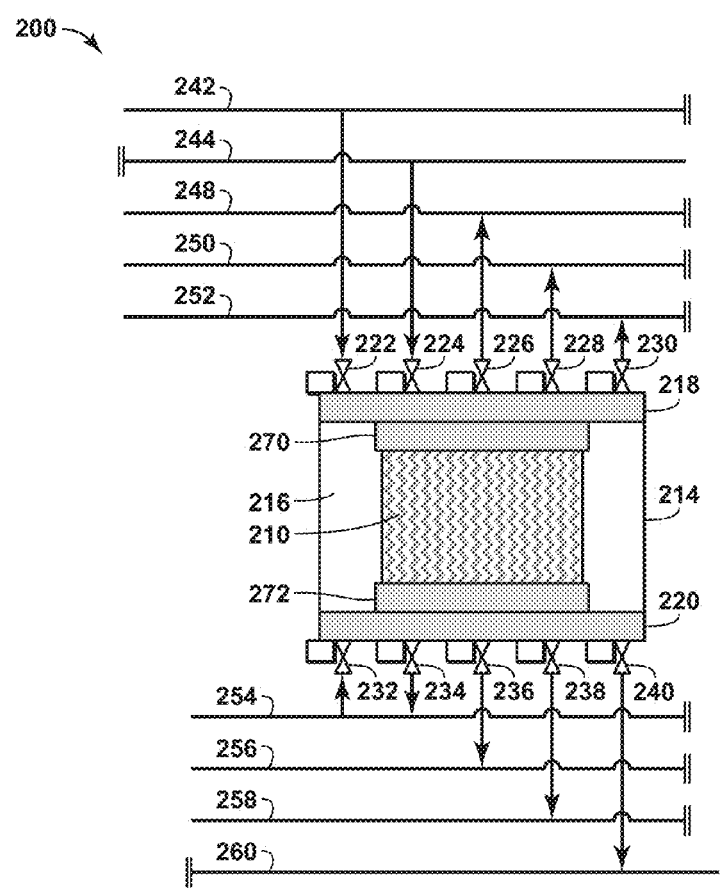
FIG. 2 is a diagram of a portion of an adsorbent bed unit having associated valve assemblies and manifolds in accordance with an embodiment of the present techniques.

FIG. 2 is a diagram 200 of a portion of an adsorbent bed unit having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 along with a feed distribution component 270 and product distribution component 272 are disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps. The housing may be configured to maintain a pressure from 0 bar a (bar absolute) to 100 bar a within the interior region.

The upper head 218 and lower head 220 contain openings in which valve structures can be inserted, such as valve assemblies 222 to 240, respectively (e.g., poppet valves). The upper or lower open flow path volume between the respective head 218 or 220 and adsorbent bed 210 can also contain distribution lines, such as feed distribution component 270 and product distribution component 272, which directly introduce fluids into the adsorbent bed 210, which may be an assembly of thermal polygon contactors. The upper head 218 contains various openings (not show) to provide flow paths through the inlet manifolds 242 and 244 and the outlet manifolds 248, 250 and 252, while the lower head 220 contains various openings (not show) to provide flow paths through the inlet manifold 254 and the outlet manifolds 256, 258 and 260. Disposed in fluid communication with the respective manifolds 242 to 260 are the valve assemblies 222 to 240. If the valve assemblies 222 to 240 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

The feed distribution component 270 may be disposed at one end of the adsorbent bed 210 (e.g., fluidly coupled to one or more of the polygon thermal contactors in the assembly of polygon thermal contactors). Similarly, product distribution component 272 may be disposed at the other end of the adsorbent bed 210 (e.g., fluidly coupled to one or more of the polygon thermal contactors in the assembly of polygon thermal contactors). The feed distribution component 270 and product distribution component 272 may be configured to isolate the fluids from the external channels into a primary fluid zone and the fluids from the internal channels into a secondary fluid zone. The primary fluid zone may manage the flow of fluids specific to the swing adsorption process, such as feed stream, purge stream, blow-down stream, depressurization stream, repressurization stream, and other suitable process streams, while the secondary zone may manage the flow of fluids to heat and cool the respective polygon thermal contactors. In addition, the feed distribution component and product distribution component may be configured to fluidly communicate with one of the polygon thermal contactors of the assembly of polygon thermal contactors or two or more of the polygon thermal contactors of the assembly of polygon thermal contactors. An exemplary assembly of polygon thermal contactors is shown in FIGS. 3A to 3C.

FIGS. 3A, 3B and 3C are diagrams 300, 320 and 340 of an exemplary assembly of polygon thermal contactors in accordance with an embodiment of the present techniques. In particular, FIG. 3A is a diagram 300 of an exemplary assembly of polygon thermal contactors 302 in accordance with an embodiment of the present techniques. In diagram 300, various polygon thermal contactors 302 are stacked together to for an assembly of polygon thermal contactors.

While each of the polygon thermal contactors 302 may include one or more passages, the gaps between polygon thermal contactors 302 in this stacked form provide additional passages for fluid flow. The adjacent groupings of polygon thermal contactors 302 provide uniform fluid channels, which may be formed into a variety of shapes, which depend on the outer surfaces of the polygon thermal contactors 302. The polygon thermal contactors 302 may be secured together via welds or other suitable means. For example, the polygon thermal contactors may be secured together by a welding a portion of the end portion (e.g., the conduit on the end portion 322) to a distribution component, as noted further below.

FIG. 3B is a diagram 320 of an exemplary polygon thermal contactor 302 in the assembly of FIG. 3A. In this diagram 320, the polygon thermal contactor 302 has an extruded polygon shape. The polygon thermal contactors 302 may include two end portions 322 and 324, which are disposed on opposite ends of the polygon thermal contactors, and a body portion 326, which forms one or more internal passages or channels through the interior of the body portion 326. One or more of the exterior surfaces of the body portion 326 may have a coating of an adsorbent material that forms an adsorbent layer or coating.

FIG. 3C is a diagram 340 of an exemplary polygon thermal contactor 302 in the assembly of FIG. 3B. In diagram 340, the fluid flow through the passage in the end portion 322, which is indicated by arrow 342, is provided into the body portion 326. Within the body portion 326, the fluid flow through the passages in the body portion 326, which is indicated by arrow 344, may include one or more passages, which may be separate and isolated passages or may permit the exchange of fluids. That is, the body potion 326 may include one or more structural elements 346 (e.g., baffles, surfaces and/or dividers) to manage the fluid flow through the interior of the body portion 326. Also, the structural elements 346 may be configured to create symmetrical passages or paths through the interior of the polygon thermal contactor.

Beneficially, the assembly of polygon thermal contactors having this configuration provides various enhancements as compared to conventional configurations. For example, the polygon thermal contactor may provide an efficient mechanism to integrate with the supply and collection plenums, such as feed distribution component 270 and product distribution component 272 of FIG. 2. That is, the supply of liquid may be passed through the interior passages of the polygon thermal contactors, while the supply of other fluids (e.g., gases) may be provided through the gaps between the polygon thermal contactors. Further, the configuration may also provide bi-directional flow of fluids through the different passages.

Figure 4A:
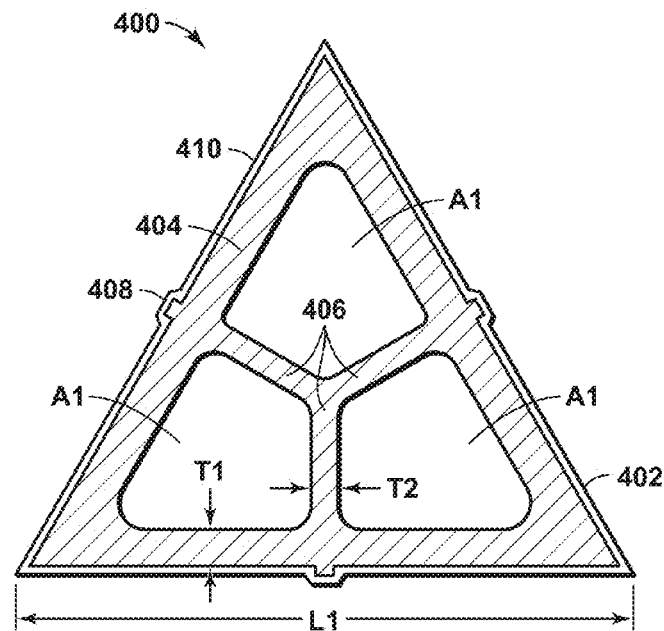
FIGS. 4A and 4B are diagrams of the architecture of a polygon thermal contactor in accordance with an embodiment of the present techniques.
Figure 4B:
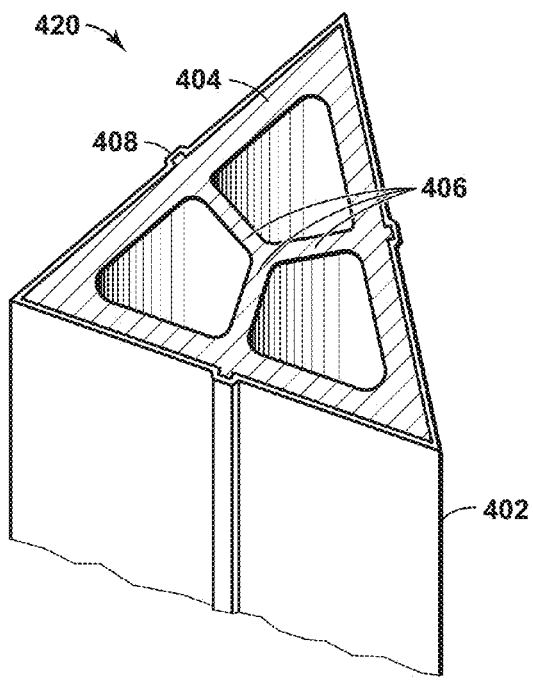

FIGS. 4A and 4B are diagrams 400 and 420 of the architecture of a polygon thermal contactor in accordance with an embodiment of the present techniques. Specifically, FIG. 4A is a diagram 400 of a cross-sectional view of a polygon thermal contactor 402, which may be one of the polygon thermal contactors 302 of FIGS. 3A to 3C. The polygon thermal contactor 402 may include an extruded layer 404, which is the shape that extends along the flow path of the fluids through the polygon thermal contactor 402. The extruded layer 404 may also include internal structural elements, such as structural elements 406, to provide different passages through the polygon thermal contactor 402. These passages may be flow areas, such as flow areas A1, which may have similar areas or different areas depending on the configuration of the structural elements 406 of the extruded layer 404. Further, the extruded layer 404 may have different thicknesses, such as thickness T1 and T2, depending on the specific application and desired heat transfer.

The area of the flow areas A1 as compared with the thickness of the extruded layer T1 may be adjusted to manage the heat transfer for the polygon thermal contactor 402. The ratio of the flow area to extruded layer may be in the range between 0.5 and 3.0, between 0.7 and 2.0 or between 0.8 and 1.3. As an example, with reference to diagram 400, the length of the sides L1 is 0.44 inches (0.011176 meters (m)), the thickness T1 is 0.03 inches (0.000762 m), while the thickness T2 is 0.02 inches (0.000508 m). In this configuration, the flow areas A1 are substantially similar, which may each provide a flow area of 0.013 squared inches (0.0003302 m).

Further, the extruded layer 404 may also include spacing element 408 (e.g., an integrated spacer tab). The spacing element 408 may be utilized to provide additional passages (e.g., external channels) when the polygon thermal contactors are disposed adjacent to each other. The spacing element may provide a uniform external channel (when disposed between two adjacent polygon thermal contactors) and may also be utilized to provide supports for the assembly of polygon thermal contactors. The height of the spacing element 408 may be adjusted based on the desired passage dimensions between adjacent polygon thermal contactors. For example, the height of the spacing element 408 may be any suitable length. For example, the height of the spacing element 408 may be between 25 micrometers to 500 micrometers, between 50 micrometers and 400 micrometers and between 75 micrometers and 250 micrometers. Moreover, the number of spacing elements along one side of the polygon thermal contactor 402 may also be adjusted. For example, each side of the polygon thermal contactor 402 may include one spacing element (e.g., one in the middle), which may result in two passages for each side that are shared with other polygon thermal contactors. Further, as another example, each side of the polygon thermal contactor 402 may include three spacing elements (e.g., one at each end of the side and one in the middle), which may result in two passages for each side. Alternatively, the each side of the polygon thermal contactor 402 may include four spacing elements (e.g., one at each end of the side and two spaced evenly from the respective ends), which may result in three passages. Furthermore, while the spacing element 408 is an integrated portion of the extruded layer 404 in this embodiment, other embodiments may include the spacing element as a separate component.

Also, each side or surface of the polygon thermal contactor may include different configurations of spacing elements or notches to provide this functionality. For example, one polygon thermal contactor may have no spacing elements on one external surface, while an adjacent polygon thermal contactor may include one or more spacing elements. As a further example, in other configurations, the spacing elements of one or more of the polygon thermal contactors may include notches within the side or external surface of the polygon thermal contactor. The notches may be used to align different components or elements, such as other polygon thermal contactors, for example.

The polygon thermal contactor 402 may also include an exterior adsorbent layer 410 disposed on the extruded layer 404. The adsorbent layer 410 may have a thickness in the range of 50 microns to 500 microns, in the range of 75 microns to 300 microns, or in the range of 100 microns to 200 microns. The adsorbent layer 410 may include an adsorbent material that is configured to separate a target gas form a gaseous mixture. The adsorbent layer 410 may include an adsorbent material supported on a non-adsorbent support. The adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials may include microporous and mesoporous sorbents functionalized with functional groups. Examples of functional groups include primary, secondary, tertiary and other non protogenic basic groups such as amidines, guanidines and biguanides.

FIG. 4B is a diagram 420 of a three-dimensional view of the polygon thermal contactor 402 of FIG. 4B. In this diagram 420, the polygon thermal contactor 402 is shown with the extruded layer 404, structural elements 406, and spacing elements 408. The integration of the polygon thermal contactor with other polygon thermal contactors is shown further in FIGS. 5A to 5C.

Figure 5A:
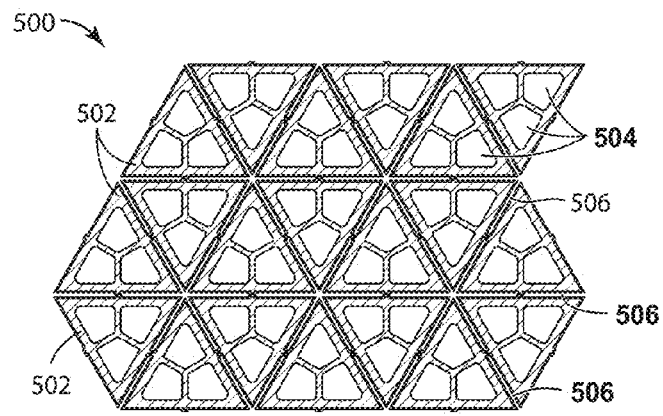
FIGS. 5A, 5B and 5C are diagrams of the polygon thermal contactor in accordance with an embodiment of the present techniques.
Figure 5B:
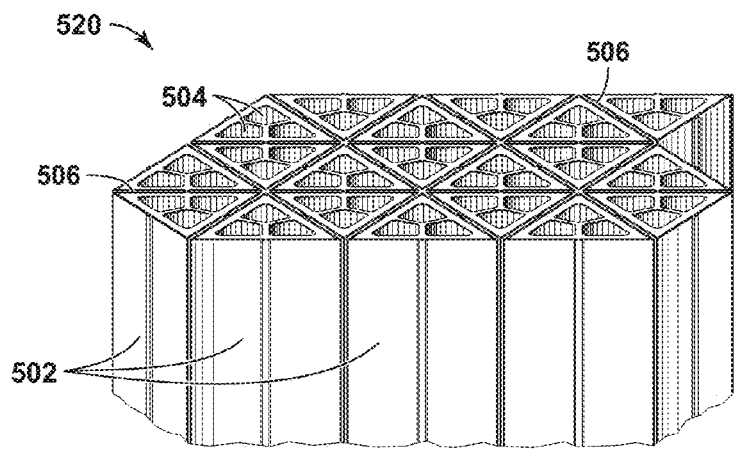
Figure 5C:
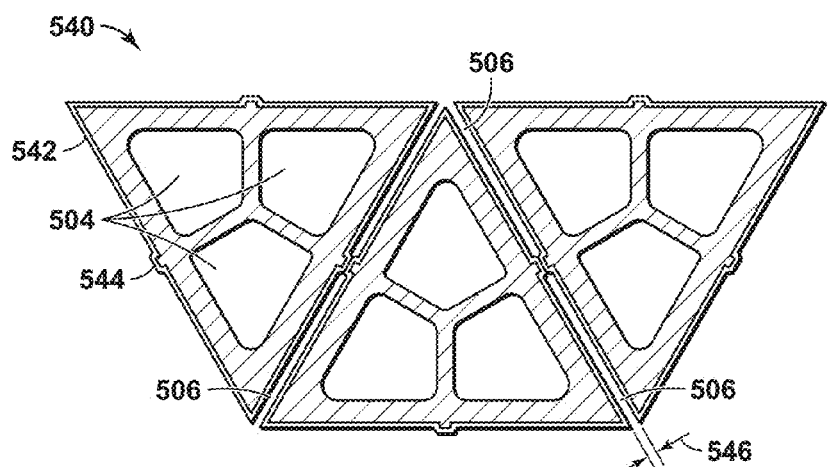

FIGS. 5A, 5B and 5C are diagrams 500, 520 and 540 of the polygon thermal contactor in accordance with an embodiment of the present techniques. Specifically, FIG. 5A is a diagram 500 of a cross-sectional view of an assembly of polygon thermal contactors 502, which may be the polygon thermal contactor 402 of FIGS. 4A to 4B. In this configuration, the assembly has three rows of polygon thermal contactors 502, which have surfaces of the absorbent layers adjacent to each other. Each polygon thermal contactors 502 in this configuration has three internal passages, such as passage 504, which are within the internal region of the respective polygon thermal contactors 502. In addition, each pair of adjacent surfaces (e.g., the absorbent layers of the respective polygon thermal contactors 502 in the pair) may form two external passages, such as passage 506, between respective polygon thermal contactors 502 in the pair.

FIG. 5B is a diagram 520 of a three-dimensional view of the assembly of polygon thermal contactors of FIG. 5A. In this diagram 520, the polygon thermal contactors 502 are shown with the internal passages, such as passages 504, formed by the extruded layer and structural elements and the external passages, such as passages 506, formed between the respective polygon thermal contactors 502 that have adjacent surfaces.

FIG. 5C is a diagram 540 of another cross-sectional view of an assembly of polygon thermal contactors 502, which may be a portion of the assembly of polygon thermal contactors 502 of FIGS. 5A and 5B. In this diagram 540, the polygon thermal contactors 502 are shown with the internal passages 504 formed by the extruded layer and structural elements and the external passages 506 formed between the respective polygon thermal contactors 502 that have adjacent surfaces. Each of the polygon thermal contactors 502 may have an adsorbent layer 542 that is disposed on the external surface of the respective polygon thermal contactors 502. Also, each of the polygon thermal contactors 502 may also have a spacing element 544 that is disposed on the external surface for each side of the respective polygon thermal contactors 502. As shown, the spacing elements 544 for two polygon thermal contactors 502 may be configured to contact each other to form the external passages, which may have a thickness 546 between 500 micrometers and 50 micrometers, between 350 micrometers and 75 micrometers, and between 100 micrometers and 200 micrometers. As a specific example the thickness may be 200 micrometers.

The configuration of the external channels formed between two adjacent polygon thermal contactors may be configured to enhance the ratio of the micro-gas channel to surface area ratio. The ratio of the micro-gas channel to surface area may be in the range between 0.5 and 3.0, between 0.7 and 2.0 or between 0.8 and 1.2.

Further, the configuration of the assembly of polygon thermal contactors may be configured to provide a specific ratio of cross section area of the total internal channels (e.g., coolant or secondary passages) to the cross section area of the external channels (e.g., adsorbent or primary passages). As an example, the external passages may be utilized for gas streams, while the internal passages may be utilized for liquid streams. The ratio of total liquid area (e.g., total internal channels area) as compared with the total gaseous area (e.g., total external channels area). The ratio of the total internal channels area to the total external channels area may be in the range between 0.5 and 3.0, between 0.7 and 2.0 or between 0.8 and 1.2.

Figure 6A:
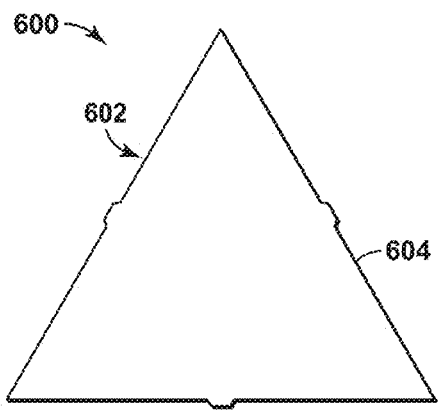
FIGS. 6A, 6B and 6C are diagrams of the unit cell geometry of a polygon thermal contactor in accordance with an embodiment of the present techniques.
Figure 6B:
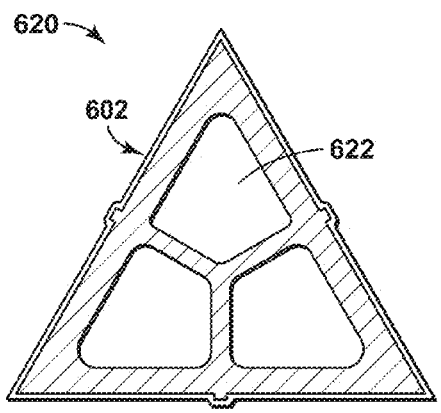
Figure 6C:
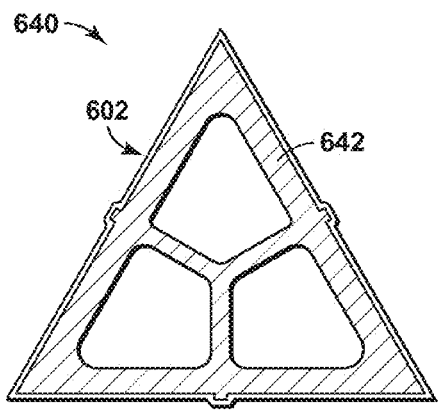

FIGS. 6A, 6B and 6C are diagrams 600, 620 and 640 of the unit cell geometry of a polygon thermal contactor in accordance with an embodiment of the present techniques. FIG. 6A is a diagram 600 of a cross-sectional view of an assembly of a polygon thermal contactor 602, which may be the polygon thermal contactor 502 of FIGS. 5A to 5C. In this diagram 600, the coated area 604 may be 0.01 inches squared (in$^2$) (0.000254 meters squared (m$^2$)).

FIG. 6B is a diagram 620 of a cross-sectional view of the polygon thermal contactor 602. In this diagram 620, the flow passage area 622 may be 0.13 in$^2$. If the three passages are similar, the total area for the three passages may be 0.39 in$^2$. The polygon thermal contactor may include metal, ceramic, or other suitable material.

FIG. 6C is a diagram 640 of a cross-sectional view of an assembly of the polygon thermal contactor 602. In this diagram 640, the extruded layer area 642 may be 0.41 in$^2$. The extruded layer may be a metal that is used as the base structure for the polygon thermal contactor 602.

Figure 7A:
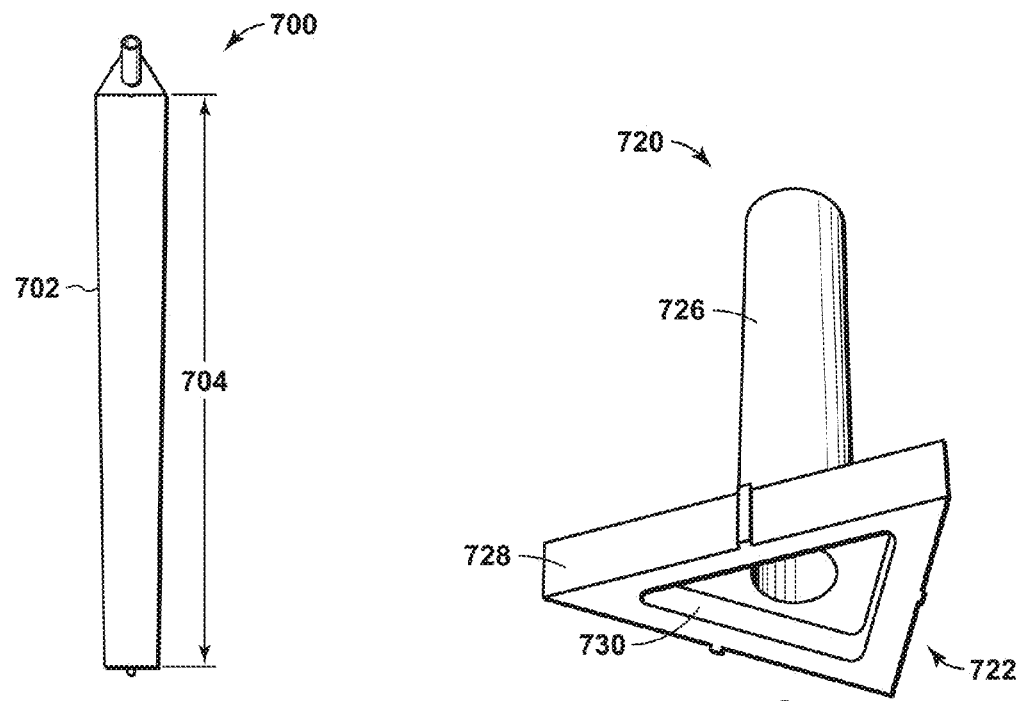
FIGS. 7A, 7B and 7C are diagrams of fabrication steps for a polygon thermal contactor in accordance with an embodiment of the present techniques.
Figure 7B:
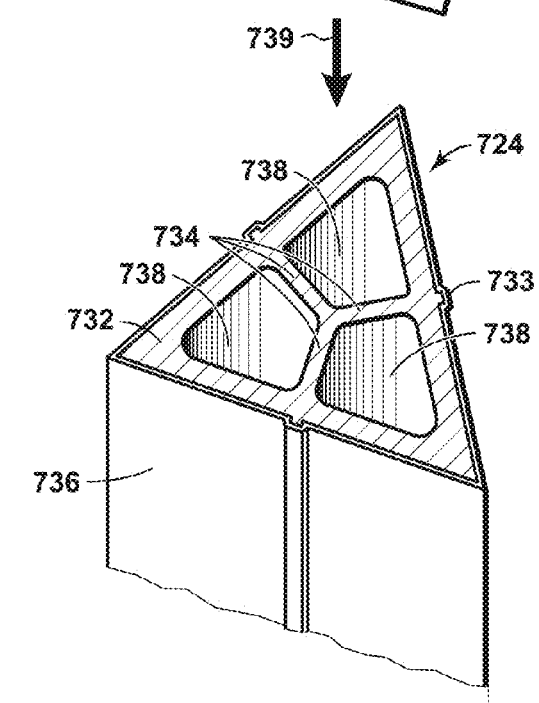
Figure 7C:
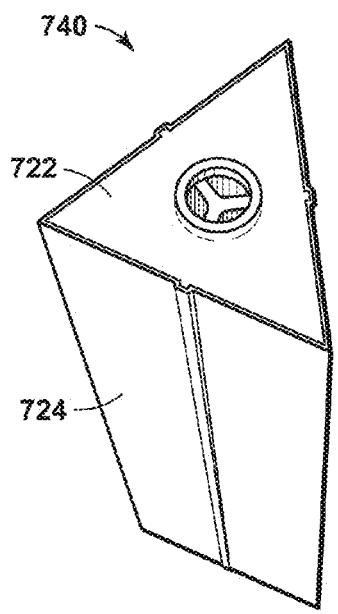

FIGS. 7A, 7B and 7C are diagrams of fabrication steps for a polygon thermal contactor in accordance with an embodiment of the present techniques. FIG. 7A is a diagram 700 of a polygon thermal contactor 702, which may be the polygon thermal contactor 302 of FIGS. 3A to 3C or the polygon thermal contactor 402 of FIGS. 4A to 4B, for example. This polygon thermal contactor 702 may be fabricated to have a length 704. The length 704 of the may be polygon thermal contactor 702 may be between 12 inches and 120 inches (0.3048 m and 3.048 m); between 18 inches and 60 inches (0.4572 m and 1.524 m); and between 24 inches and 48 inches (0.6096 m and 1.2192 m), or may about 36 inches (0.9144 m). As part of the fabrication process, the different portions of the polygon thermal contactor 702 may be fabricated as separate components that are connected together. For example, the polygon thermal contactor may be fabricated via three-dimensional printing techniques. As another example, the polygon thermal contactor may be fabricated, and then the adsorbent layer may be applied. The application of the adsorbent layer may include applying the adsorbent via spray, via depositional techniques and/or via the electrical charge technique.

For example, FIG. 7B is a diagram 720 of an exploded view of the end portion 722 and a body portion 724 of the polygon thermal contactor 702 of FIG. 7A. The end portion 722 has a conduit 726 and a closure plate 728, which may be coupled together or may be cast as a single component. The conduit 726 and a closure plate 728 may be made predominately from stainless steel or other suitable material. The closure plate 728 may also include a recessed pocket 730 to further enhance liquid distribution or collection. The body portion 724 of the polygon thermal contactor 702 may include the extruded layer 732 and structural elements 734 along with an absorbent layer 736 disposed on the outer surface of the body portion 724. Further, the extruded layer 732 may also include spacing elements 733 formed on the external surface of the extruded layer 732. The extruded layer 732 and structural elements 734 may be composed of stainless steel or other suitable materials. The extruded layer 732 and structural elements 734 may form one or more fluid flow passages, such as passages 738. The extruded layer 732 and structural elements 734 may be formed by an extrusion process. Then, the absorbent layer 736 may be formed via a deposition process. Finally, the ends of the end portion 722 and a body portion 724 may be joined by a brazing process, as shown by the arrow 739.

FIG. 7C is a diagram 740 of the assembled polygon thermal contactor 702. As shown in this diagram 740, the end portion 722 and the body portion 724 are coupled together to form one end of the polygon thermal contactor 702. The coupling of the end portion 722 and the body portion 724 may involve welding, adhesives, fasteners or other suitable mechanism to secure the end portion 722 and the body portion 724 together. The coupling of the end portion 722 and the body portion 724 may prevent the flow of fluids from within the internal region formed by the end portion 722 and the body portion 724. A similar process may be used to couple the other end portion (not shown) to the body portion 724 to form the polygon thermal contactor 702.

Figure 8A:
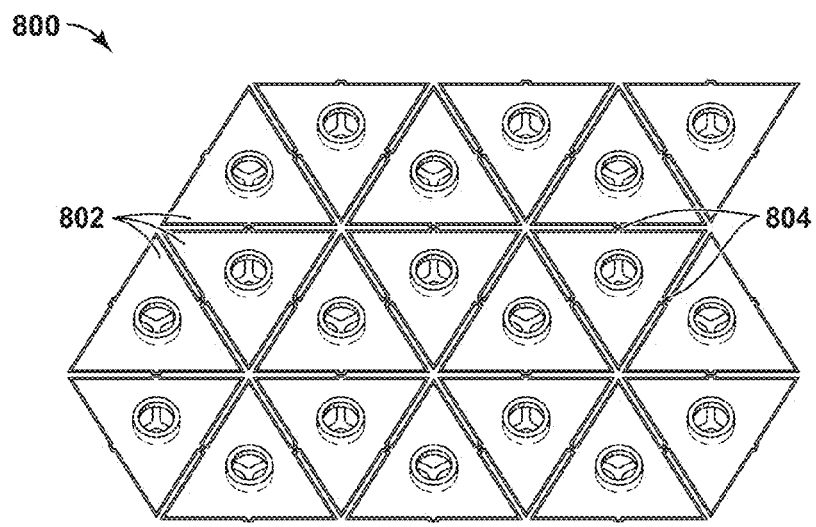

FIGS. 8A, 8B, 8C, 8D and 8E are diagrams of fabrication steps for an assembly of polygon thermal contactors in accordance with an embodiment of the present techniques. FIG. 8A is a diagram 800 of a top view of a group of polygon thermal contactors 802, which may include the polygon thermal contactor 702 of FIGS. 7A to 7C, coupled together to form an assembly of polygon thermal contactors. The polygon thermal contactors 802 may be coupled together via welds, such as weld 804, as part of the fabrication process. The weld 804 may be located above the spacing element of the respective polygon thermal contactors 802. As may be appreciated other attachments methods may be utilized to couple the polygon thermal contactors 802.

Figure 8B:
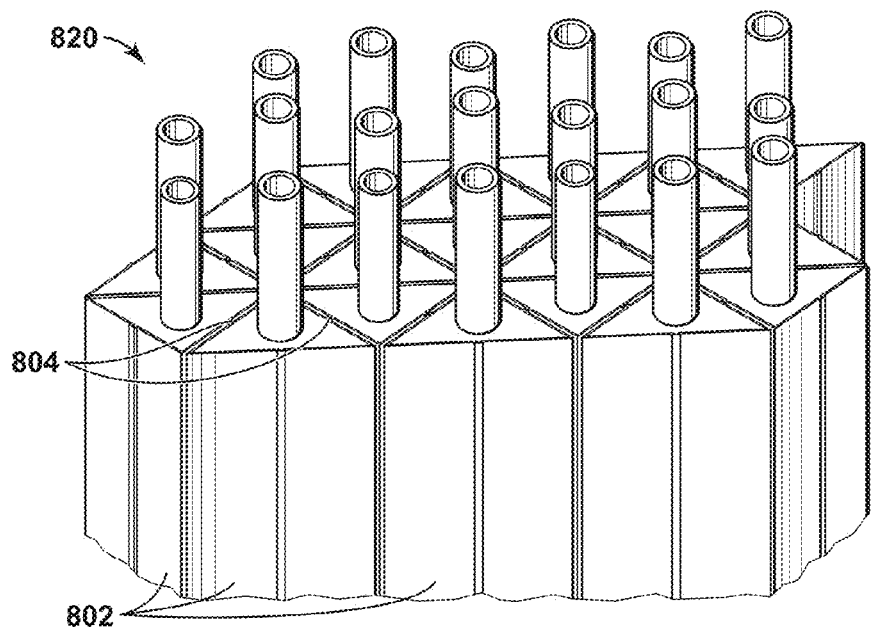

FIG. 8B is a diagram 820 of an alternative view of the assembly of polygon thermal contactors. This alternative view has the polygon thermal contactors 802 coupled together via welds, such as weld 804.

Once the assembly of the polygon thermal contactors 802 is coupled together, the feed distribution component 842 may be provided, as shown in FIG. 8C. FIG. 8C is a diagram 840 of an assembly of polygon thermal contactors 802 from FIGS. 8A and 8B. In this diagram 840, the feed distribution component 842 may include a top plate 844, support bars 846, and a bottom plate 848. The top plate 844, support bars 846, and a bottom plate 848 may be composed of any material that is able to withstand the pressure swing loading along with the thermal movement, which may be secured together via welds, glue or other suitable means. For example, the top plate 844, support bars 846, and a bottom plate 848 may be composed of stainless steel or other suitable material (e.g., marine grade stainless steel, such as American Iron and Steel Institute (AISI) or Society of Automobile Engineers (SAE) type 316 stainless steel). The top plate 844 may be coupled to the support bars 846, and then moved along the arrow 850 to integrate with the bottom plate 848. The bottom plate 848 may be configured to be disposed to provide a passage 852. The passage 852 may provide a channel for fluid flow through the polygon thermal contactors 802 and along the adsorbent layer of the polygon thermal contactors 802. The height 854 of the passage (e.g., distance between the bottom plate 848 and the closure plate of the polygon thermal contactors 802). The specific configuration of the passage 852 may depend on the height of the primary fluid zone may be based on the primary fluids (e.g., feed streams, product streams, waste streams and purge streams) being provided to and from the polygon thermal contactor, the uniformity pattern of the fluids, the volume of primary fluid zone, the cross section dimensions of the polygon thermal contactors and any combination thereof. Accordingly, the height 854 of the primary fluid zone may be between 0.1 inches and 3 inches (0.00254 m and 0.0762 m), between 0.15 inches and 2 inches (0.00381 m and 0.0508 m) and/or between 0.2 inches and 1 inch (0.00508 m and 0.0254 m). As an example, the depth of the primary fluid zone may be about 0.1875 inches (0.0047625 m). The distance between the bottom plate 848 and the closure plate may be adjusted to lessen the bed volume dead space, which may involve additional purge gas to sweep clean the passages.

FIG. 8D is a diagram 860 of the feed distribution component 842 coupled to the assembly of polygon thermal contactors 802. In this configuration, the feed distribution component 842 may provide a passage 862 (e.g., secondary fluid zone) that provides access to the polygon thermal contactors 802 via the respective conduits. The passage 862 is defined by the top plate 844, support bars 846, and the bottom plate 848. The height 864 may be based on the fluids being provided to the internal passages via the mid-purge distribution zone, the volume of purge fluid to be utilized in the purge step, the cross section dimensions of the contactor and any combination thereof Accordingly, the height 864 may be between 0.2 inches and 10 inches (0.00508 m and 0.254 m), between 0.5 inches and 5 inches (0.0127 m and 0.127 m) and between 0.75 inches and 2 inches (0.01905 m and 0.0508 m). As an example, the height 864 of the passage (e.g., distance between the top plate 844 and the bottom plate 848) may be about 0.8125 inches (0.0206375 m).

FIG. 8E is a diagram 880 of the feed distribution component 842 coupled to the assembly of polygon thermal contactors 802. As shown in this diagram 880, the feed distribution component 842 may also include walls to further manage fluid flow through the respective passages. The different conduits providing fluid communication with the different passages is not shown in this diagram 880. The surfaces of the passages may include a coated surface. As may be appreciated, the product distribution component (not shown) may include a top plate, support bars, and a bottom plate, and be assembled in the similar manner to the feed distribution component 842.

Figure 9A:
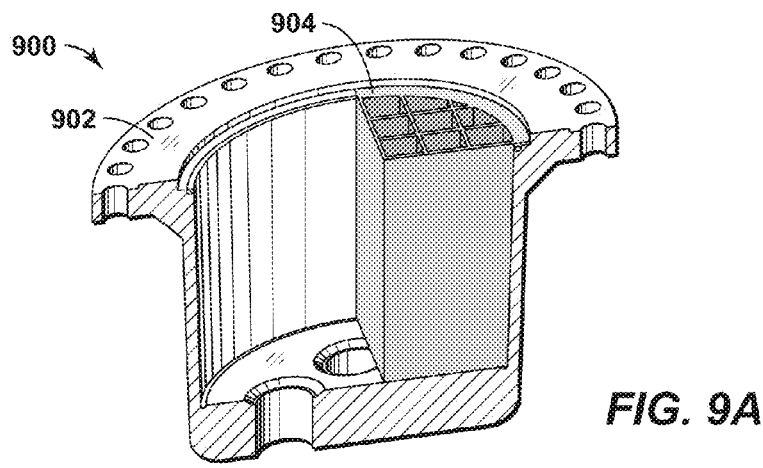
FIGS. 9A, 9B, 9C, 9D, 9E and 9F are diagrams of an adsorbent bed unit and fabrication steps for the adsorbent bed unit in accordance with an embodiment of the present techniques.
Figure 9B:
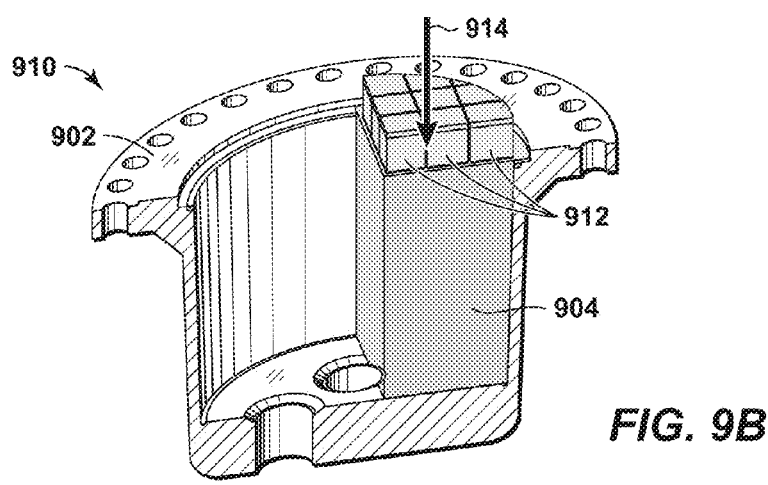
Figure 9C:
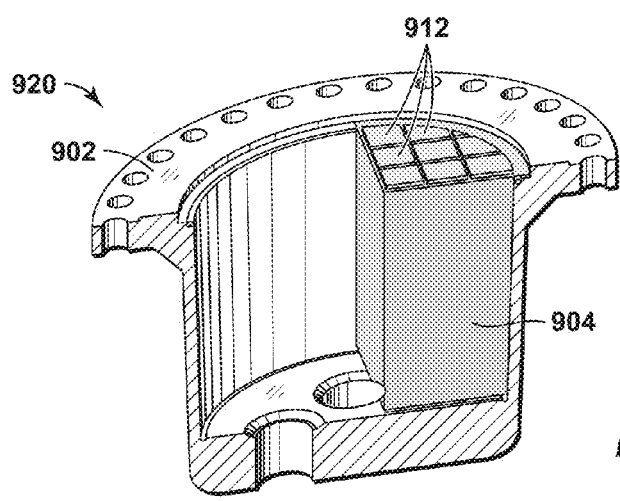
Figure 9D:
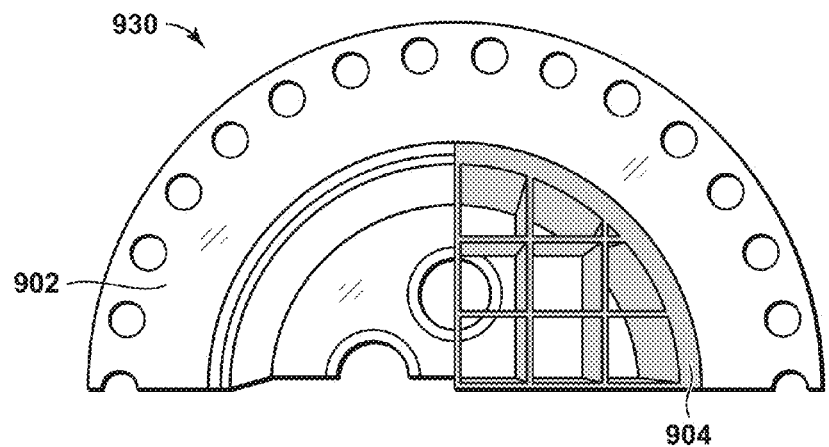
Figure 9E:
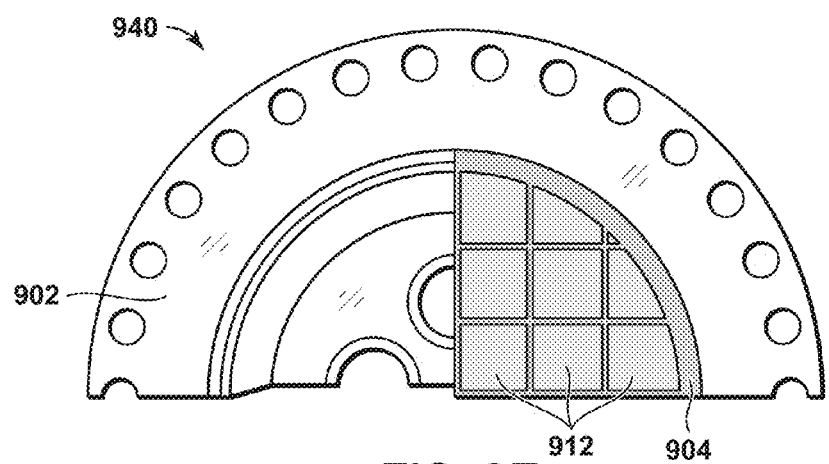
Figure 9F:
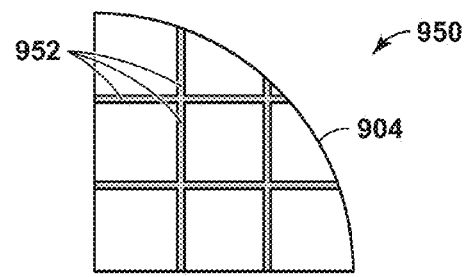

FIGS. 9A, 9B, 9C, 9D, 9E and 9F are diagrams 900, 910, 920, 930, 940 and 950 of an adsorbent bed unit and fabrication steps for the adsorbent bed unit in accordance with an embodiment of the present techniques. FIGS. 9A to 9C are the fabrication steps, while FIGS. 9D to 9F are different views of the adsorbent bed unit's components. FIG. 9A is a diagram 900 of adsorbent bed unit housing 902 and a contactor assembly support 904. The contactor assembly support 904 may be utilized to provide stability to the polygon thermal contactors and to prevent fluids from bypassing the polygon thermal contactors. The contactor assembly support 904 may be formed into a fluid impermeable housing to manage the flow of fluids within the absorption bed unit housing 902. FIG. 9D is a diagram 930 of adsorbent bed unit housing 902 and a contactor assembly support 904 of FIG. 9A.

FIG. 9B is a diagram 910 of adsorbent bed unit housing 902, the contactor assembly support 904, and polygon thermal contactors 912. The polygon thermal contactors 912 are inserted into the different compartments of the contactor assembly support 904, as shown by the arrow 914. FIG. 9E is a diagram 940 of adsorbent bed unit housing 902, contactor assembly support 904 and polygon thermal contactors 912 of FIG. 9B.

FIG. 9C is a diagram 920 of adsorbent bed unit housing 902, the contactor assembly support 904, and polygon thermal contactors 912 in the installation of FIG. 9B. The polygon thermal contactors 912 disposed within the different compartments of the contactor assembly support 904 in this configuration. The polygon thermal contactors 912 may be the assembly of polygon thermal contactors 802 of FIG. 8E.

FIG. 9F is a diagram 950 of the contactor assembly support 904, which may be used in the FIGS. 9A to 9D. The contactor assembly support 904 has various divider elements 952 that are utilized to form the housing walls or surfaces. The contactor assembly support 904 and divider elements 952 may be a fluid impermeable housing that forms one or more compartments. These compartments may be formed to house one or more polygon thermal contactors.

Figure 10A:
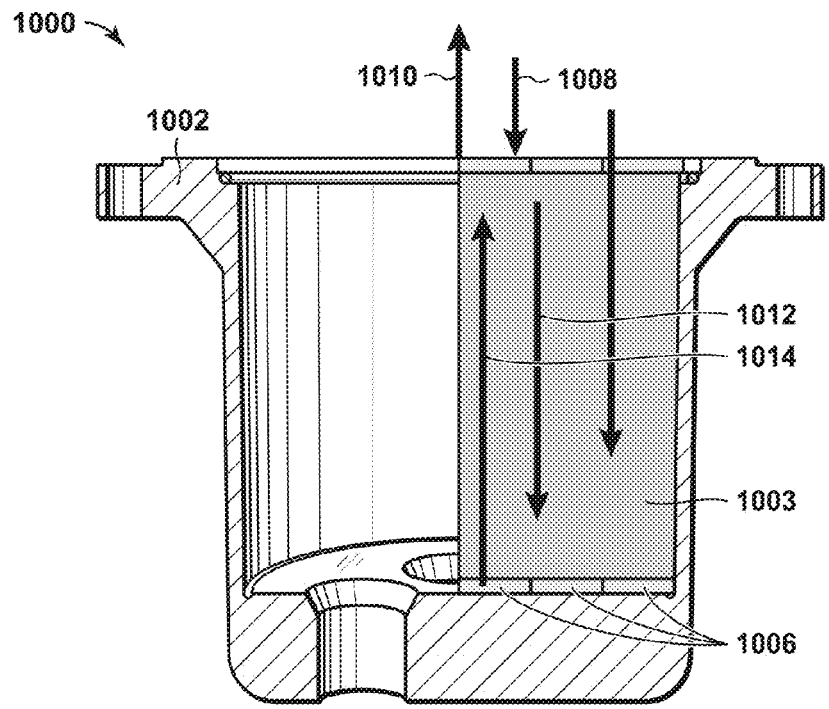
FIGS. 10A, 10B, 10C and 10D are diagrams of thermal contactor liquid dynamics in accordance with an embodiment of the present techniques.

FIGS. 10A, 10B, 10C and 10D are diagrams 1000, 1020, 1040 and 1060 of thermal contactor liquid dynamics in accordance with an embodiment of the present techniques. FIG. 10A is a diagram 1000 of a partial view of an adsorbent bed unit 1002 and a contactor assembly support 1003 and an assembly of polygon thermal contactors 1006, which may each be the components from FIGS. 9A to 9E. In this diagram 1000, the inlet fluid may be provided as shown by arrow 1008 and the outlet may be provided as shown by arrow 1010. Within the polygon thermal contactors 1006, the fluid may flow through the internal channels of one of the polygon thermal contactors, as shown by arrow 1012, while another fluid may flow through the channels of another polygon thermal contactor or another channel of the same polygon thermal contactor. Further, yet another fluid may be provided and flow in the external channels formed between two or more of the polygon thermal contactors, as shown by arrow 1014.

For example, the adsorbent bed unit 1002 may include one or more polygon thermal contactors 1006, which are disposed in a contactor assembly support 1003. In this configuration, a gas stream may be provided that flows along the external channels or passages between two or more of the polygon thermal contactors 1006. The gas stream may pass below the plenum into the external channels formed between the polygon thermal contactors 1006 in the contactor assembly support 1003. Certain liquids may be utilized to flow within the polygon thermal contactors 1006 to manage the temperature of the adsorbent coating on the exterior of the polygon thermal contactors 1006.

Figure 10B:
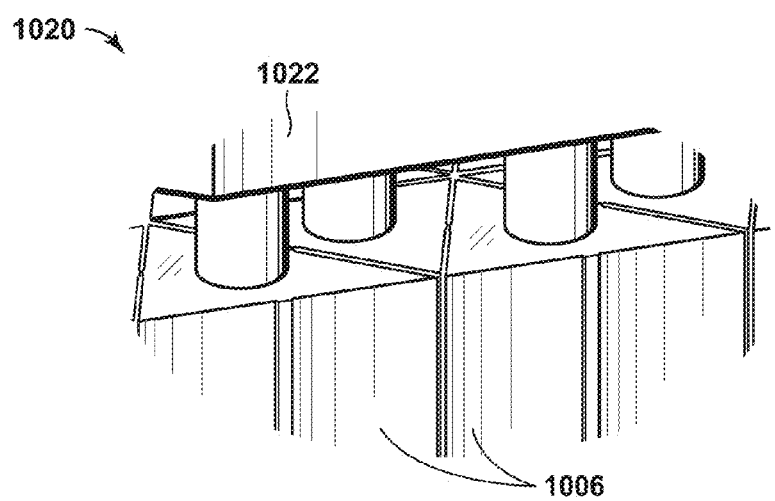

FIG. 10B is a diagram 1020 of the polygon thermal contactors 1006 and a portion of the feed distribution component 1022, which may be the feed distribution component 842 of FIG. 8C. As shown in this diagram 1020, a fluid stream (e.g., gas stream) may pass from the primary fluid zone (e.g., region formed below the bottom plate of the feed distribution component and above the contactor) into the passages between the polygon thermal contactors 1006. This configuration may provide a unidirectional flow for the gas stream through the polygon thermal contactors 1006 in a specific contactor assembly support. As may be appreciated, different contactor assembly supports within an adsorbent bed unit may be configured to flow in different directions to provide stability to the adsorbent bed unit and/or optimize the efficiency of the dynamics for the process or the adsorbent bed unit.

Figure 10C:
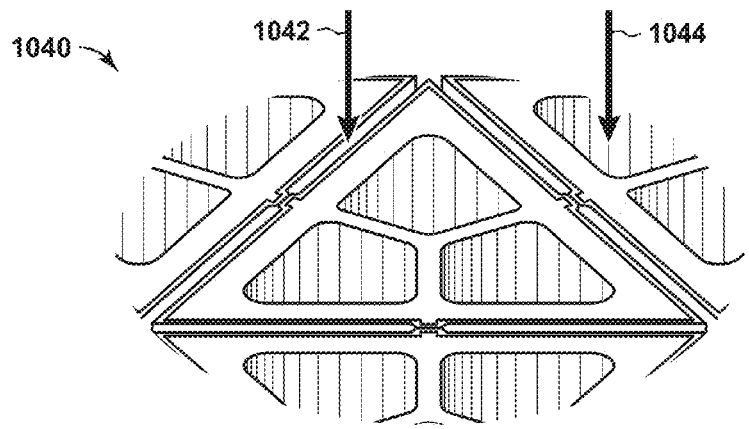

FIG. 10C is a diagram 1040 of a different view of the polygon thermal contactors 1006. In this diagram 1040, the gas stream may flow along the passages indicated by arrow 1042, while the liquid stream may flow along the passages indicated by arrow 1044. The feed distribution component acts as a diffuser that directs the gas between the plenums.

Figure 10D:
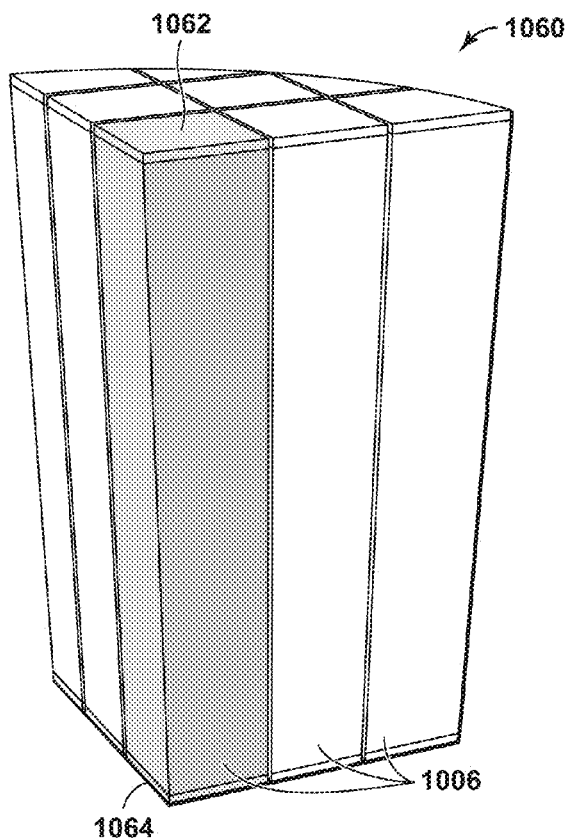

FIG. 10D is a diagram 1060 of a different view of the assembly of polygon thermal contactors 1006. In this diagram 1060, the polygon thermal contactors 1006 may have a liquid plenum inlet 1062 and a liquid plenum outlet 1064. These plenums may operate separately for different compartments and/or may operate the same for different compartments.

Figure 11A:
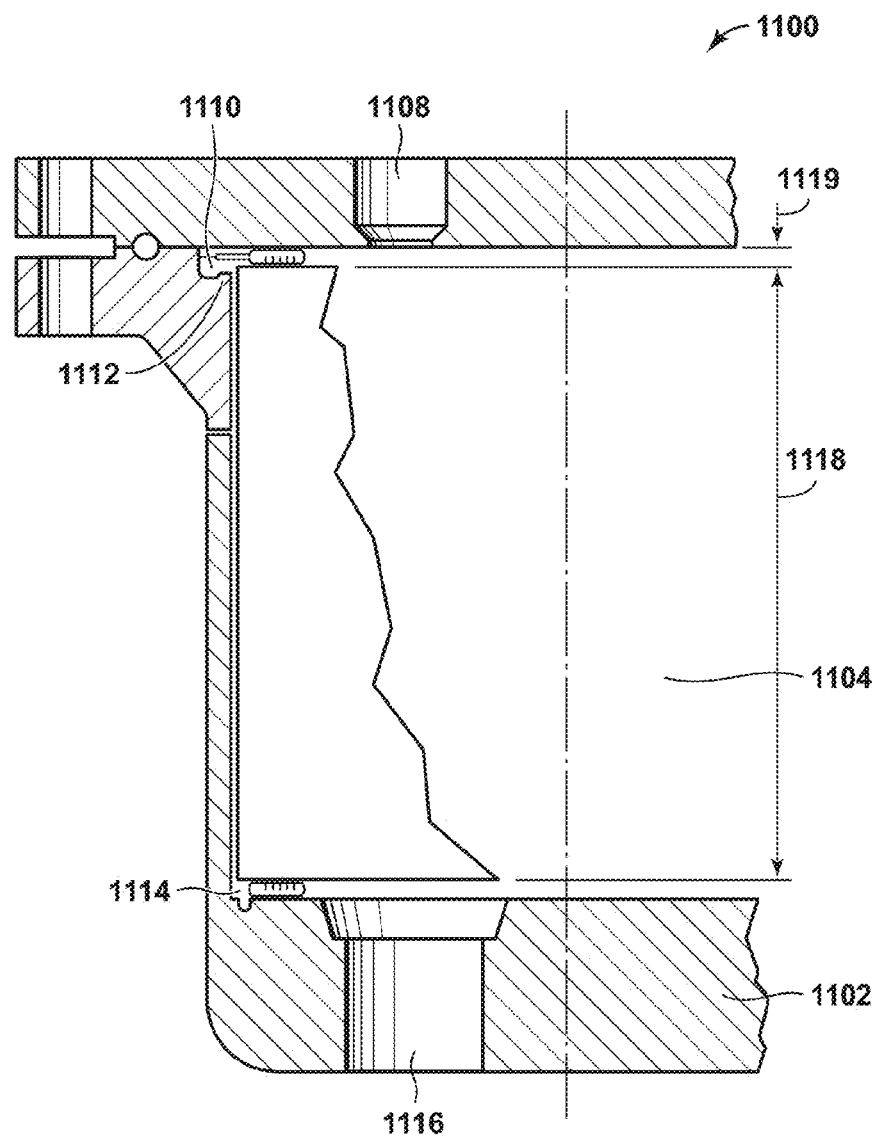
FIGS. 11A, 11B and 11C are diagrams of an adsorbent bed unit in accordance with an embodiment of the present techniques.
Figure 11B:
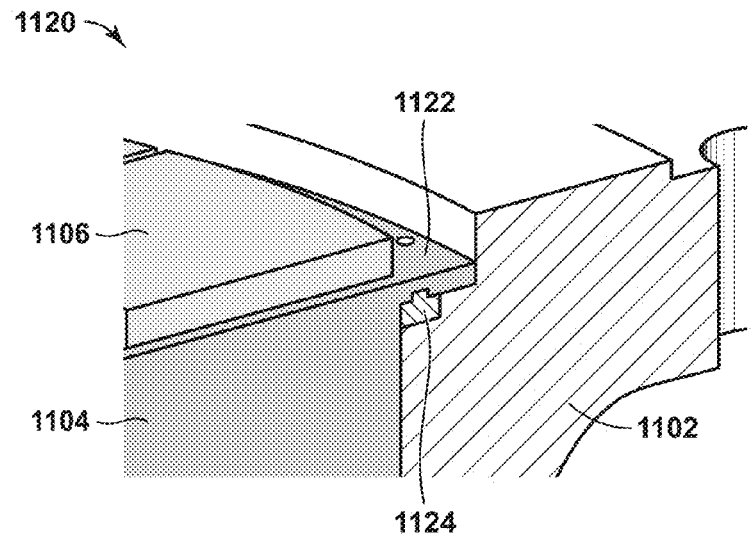
Figure 11C:
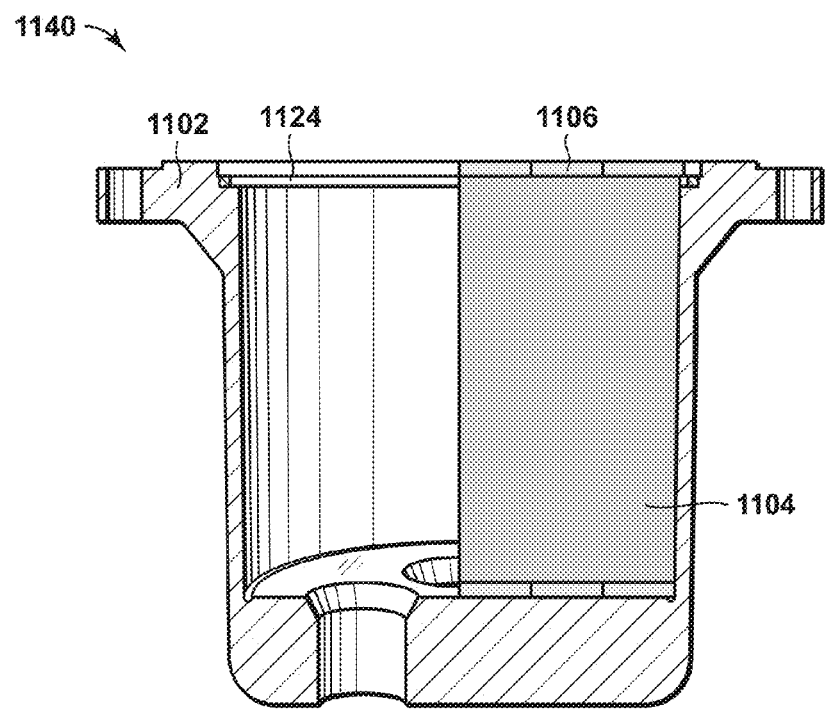

FIGS. 11A, 11B and 11C are diagrams 1100, 1120 and 1140 of an adsorbent bed unit in accordance with an embodiment of the present techniques. FIG. 11A is a diagram 1100 of the adsorbent bed unit housing 1102 and a contactor assembly support 1104 and an assembly of polygon thermal contactors, which may be adsorbent bed unit 1002 and associated components from FIGS. 10A to 10D. In this diagram 1100, the configuration of the adsorbent bed unit may include a contactor assembly support 1104 and an assembly of polygon thermal contactors. The configuration may include a feed side valve 1108, liquid inlet plenum 1110, a vapor seal 1112, liquid outlet plenum 1114 and product side valve 1116. The feed side valve 1108 and product side valve 1116 may be openings, which have poppet valves. The liquid inlet plenum 1110, vapor seal 1112, and liquid outlet plenum 1114 may be used to manage the flow of fluids through the polygon thermal contactors 1106. In particular, the vapor seal 1112 may be used to lessen or eliminate gaseous streams from paths along the sides of the shell or housing (e.g., adsorbent bed unit 1102 and/or contactor assembly support 1104). The depth 1118 may be between 12 inches and 120 inches (0.3048 m and 3.048 m); between 18 inches and 60 inches (0.4572 m and 1.524 m); and between 24 inches and 48 inches (0.6096 m and 1.2192 m), or may about 36 inches (0.9144 m), while the depth 1119 may be between 0.2 inches and 10 inches (0.00508 m and 0.254 m), between 0.5 inches and 5 inches (0.0127 m and 0.127 m) and between 0.75 inches and 2 inches (0.01905 m and 0.0508 m).

FIG. 11B is a diagram 1120 of a different view of the adsorbent bed unit 1102, contactor assembly support 1104 and polygon thermal contactors 1106. In this diagram 1120, a concentric step 1122 is utilized. The step 1122 may be machined into the vessel and used as a closure flange. Also, within the step 1122, an internal by-pass seal 1124 may be utilized to further isolate fluid flow from the adsorbent bed unit 1102 and the contactor assembly support 1104.

FIG. 11C is a diagram 1140 of a different view of the adsorbent bed unit 1102, contactor assembly support 1104 and polygon thermal contactors 1106. In this diagram 1140, the internal by-pass seal 1124 is shown along the internal portion of the adsorbent bed unit 1102 and the contactor assembly support 1104.

In one or more embodiments, the adsorbent bed assembly may include an adsorbent bed that can be used for the separation of a target gas form a gaseous mixture. The adsorbent is usually comprised of an adsorbent material supported on a non-adsorbent support, or contactor. Such contactors contain substantially parallel flow channels wherein 20 volume percent, preferably 15 volume percent or less of the open pore volume of the contactor, excluding the flow channels, is in pores greater than about 20 angstroms. A flow channel is taken to be that portion of the contactor in which gas flows, if a steady state pressure difference is applied between the point or place at which a feed stream enters the contactor and the point or place at which a product stream leaves the contactor. In the contactor, the adsorbent is incorporated into the wall of the flow channel.

Non-limiting examples of adsorbent materials that can be used with the method and system include high surface area (greater than (>) 10 $m^2/gm$ and preferably>75 $m^2/gm$) alumina, microporous zeolites (preferably zeolites with particle sizes less than (<) 1 mm), other microporous materials, mesoporous materials and ordered mesoporous materials. Nonlimiting examples of these materials include carbons, cationic zeolites, high silica zeolites, highly siliceous ordered mesoporous materials, sol gel materials, ALPO materials (microporous and mesoporous materials containing predominantly aluminum phosphorous and oxygen), SAPO materials (microporous and mesoporous materials containing predominantly silicon aluminum phosphorous and oxygen), MOF materials microporous and mesoporous materials comprised of a metal organic framework) and ZIF materials (microporous and mesoporous materials comprised of zeolitic imidazolate frameworks). Other materials include microporous and mesoporous sorbents functionalized with functional groups. Examples of functional groups include primary, secondary, tertiary and other non protogenic basic groups such as amidines, guanidines and biguanides.

In one or more embodiments, the swing adsorption process using the polygon thermal contactors of the present techniques is a temperature swing adsorption (TSA) or a rapid cycle temperature swing adsorption (RCTSA). For TSA the total cycle times are typically less than 12 hours, preferably less than 8 hours, preferably less than 6 hours, preferably less than 4hours. For RCTSA the total cycle times are typically less than 600 seconds, preferably less than 200 seconds, more preferably less than 100 seconds, and even more preferably less than 60 seconds.

Adsorptive kinetic separation processes, apparatus, and systems, as described above, are useful for development and production of hydrocarbons, such as gas and oil processing. Particularly, the provided processes, apparatus, and systems are useful for the rapid, large scale, efficient separation of a variety of target gases from gas mixtures. In particular, the processes, apparatus, and systems may be used to prepare natural gas products by removing contaminants and heavy hydrocarbons, i.e., hydrocarbons having at least two carbon atoms. The provided processes, apparatus, and systems are useful for preparing gaseous feed streams for use in utilities, including separation applications such as dew point control, sweetening/detoxification, corrosion protection/control, dehydration, heating value, conditioning, and purification. Examples of utilities that utilize one or more separation applications include generation of fuel gas, seal gas, non-potable water, blanket gas, instrument and control gas, refrigerant, inert gas, and hydrocarbon recovery. Exemplary "not to exceed" product (or "target") gas specifications include: (a) 2 volume percent (vol. %) $CO_2$, 4 parts per million (ppm) $H_2S$, (b) 50 ppm $CO_2$, 4 ppm $H_2S$, or (c) 1.5 vol. % $CO_2$, 2 ppm $H_2S$.

The provided processes, apparatus, and systems may be used to remove acid gas from hydrocarbon streams. Acid gas removal technology may be useful for gas reserves that exhibit higher concentrations of acid gas, i.e., sour gas resources. Hydrocarbon feed streams vary widely in amount of acid gas, such as from several parts per million acid gas to 90 vol. % acid gas. Non-limiting examples of acid gas concentrations from exemplary gas reserves include concentrations of at least: (a) 1 vol. % $H_2S$, 5 vol. % $CO_2$, (b) 1 vol. % $H_2S$, 15 vol. % $CO_2$, (c) 1 vol. % $H_2S$, 60 vol. % $CO_2$, (d) 15 vol. % $H_2S$, 15 vol. % $CO_2$, and (e) 15 vol. % $H_2S$, 30 vol. % $CO_2$.

In one or more embodiments, the streams provided to the adsorbent bed and removed from an adsorbent bed may have different compositions. For example, the hydrocarbon containing stream may have greater than 0.005 volume percent $CO_2$ based on the total volume of the gaseous feed stream and an adsorbent material in the adsorbent bed has a higher selectivity to $CO_2$ as compared to hydrocarbons. Also, the product stream may have greater than 98 volume percent hydrocarbons based on the total volume of the product stream. Further, the gaseous feed stream may be a hydrocarbon containing stream having greater than 20 volume percent $CO_2$ based on the total volume of the gaseous containing stream.

In view of the many possible embodiments to which the principles of the disclosed invention may be applied, it should be recognized that the illustrative embodiments are only preferred examples of the invention and should not be taken as limiting the scope of the invention.

What is claimed is:

1. An adsorbent bed unit for a cyclical swing process comprising:
    a housing having an interior region;
    an assembly of thermal polygon contactors disposed in the interior region, each of the thermal polygon contactors having one or more internal channels within each of the thermal polygon contactors and one or more external channels formed between two or more of the thermal polygon contactors in the assembly of thermal polygon contactors, wherein at least one external surface for each of the thermal polygon contactors has an adsorbent coating; and
    wherein the adsorbent bed unit is configured to isolate direct fluid communication between fluids in the one or more internal channels and fluids in the one or more external channels.

2. The adsorbent bed unit of claim 1, further comprising a feed distribution component coupled to one or more of the thermal polygon contactors, wherein the feed distribution component is configured to:
    provide fluid communication between a feed secondary fluid zone and the one or more internal channels;
    provide fluid communication between a feed primary fluid zone and the one or more external channels; and
    isolate direct fluid communication between the one or more external channels and the one or more internal channels.

3. The adsorbent bed unit of claim 2, further comprising a product distribution component coupled to one or more of the thermal polygon contactors, wherein the product distribution component is configured to:
    provide fluid communication between a product secondary fluid zone and the one or more internal channels;

provide fluid communication between a product primary fluid zone and the one or more external channels; and isolate direct fluid communication between the one or more external channels and the one or more internal channels.

4. The adsorbent bed unit of claim 3, wherein the one or more of the feed distribution component and the product distribution component is coupled to the one or more of the thermal polygon contactors via a weld.

5. The adsorbent bed unit of claim 1, further comprising one or more spacing elements associated with one of the thermal polygon contactors and configured to provide structure for a portion of the one or more external channels.

6. The adsorbent bed unit of claim 5, wherein the one or more spacing elements have a height between 25 micrometers to 500 micrometers.

7. The adsorbent bed unit of claims 1, wherein the housing is configured to maintain a pressure from 0 bar a to 100 bar a within the interior region.

8. The adsorbent bed unit of claim 1, wherein the one or more internal channels and the one or more external channels are configured to have a ratio of total internal channels area to total external channels area in the range between 0.5 and 3.0.

9. The adsorbent bed unit of claim 1, wherein the one or more internal channels and the one or more external channels are configured to have a ratio of total internal channels area to total external channels area in the range between 0.8 and 1.2.

10. The adsorbent bed unit of claim 1, wherein one or more internal channels and one or more external channels are configured to provide substantially parallel and isolated fluid flow along the axial length of the thermal polygon contactors.

11. A method of manufacturing an adsorbent bed unit, comprising:
fabricating a plurality of thermal polygon contactors, wherein each of the plurality of thermal polygon contactors comprises one or more internal channels within each of the thermal polygon contactors and wherein at least one external surfaces for each of the thermal polygon contactors has an adsorbent coating;
securing two or more of the plurality of thermal polygon contactors to each other to form an assembly of thermal polygon contactors, wherein one or more external channels are formed between two or more of the thermal polygon contactors;
constructing an adsorbent bed unit housing, wherein the an adsorbent bed unit housing has an interior region; and
disposing the assembly of contactors into the adsorbent bed unit housing.

12. The method of claim 11, wherein one or more internal channels and one or more external channels are configured to provide substantially parallel and isolated fluid flow along the axial length of the thermal polygon contactors.

13. The method of claim 11, wherein fabricating the plurality of thermal polygon contactors, further comprises:
forming a body portion into a polygon shape having a first end and a second end, wherein the body portion is configured to provide the one or more internal channels through an axial length from the first end to the second end, wherein the one or more internal channels provide one or more enclosed fluid flow passages from a first opening at a first end of the body portion along the axial length of the body portion to a second opening at a second end of the body portion;

disposing an adsorbent coating on at least one external surface of the body portion;
forming a first end portion coupled to the first end of the body portion; and
forming a second end portion coupled to the second end of the body portion.

14. The method of claim 11, wherein the adsorbent coating comprises one or more of alumina, microporous zeolites, carbons, cationic zeolites, high silica zeolites, highly siliceous ordered mesoporous materials, sol gel materials, ALPO materials, SAPO materials, MOF materials and ZIF materials.

15. The method of claim 11, further comprising disposing a liner around a portion of the assembly of thermal polygon contactors.

16. The method of claim 11, further comprising coupling a feed distribution component to one or more of the thermal polygon contactors at a first end of the assembly of thermal polygon contactors, wherein the feed distribution component is configured to:
provide fluid communication between a feed secondary fluid zone and the one or more internal channels;
provide fluid communication between a feed primary fluid zone and the one or more external channels; and
isolate direct fluid communication between the one or more external channels and the one or more internal channels.

17. The method of claim 11, further comprising coupling a product distribution component to one or more of the thermal polygon contactors at a second end of the assembly of thermal polygon contactors, wherein the product distribution component is configured to:
provide fluid communication between a product secondary fluid zone and the one or more internal channels;
provide fluid communication between a product primary fluid zone and the one or more external channels; and
isolate direct fluid communication between the one or more external channels and the one or more internal channels.

18. The method of claim 11, further comprising disposing a sealing component between the housing and the assembly of thermal polygon contactors, wherein the sealing component is configured to prevent fluids from passing between the housing and the assembly of thermal polygon contactors.

19. The method of claim 11, further comprising forming one or more spacing elements for each of the thermal polygon contactors and configured to provide structure for a portion of the one or more external channels.

20. The method of claim 19, wherein the one or more spacing elements have a height between 25 micrometers to 500 micrometers.

21. The method of claim 11, wherein the one or more internal channels and the one or more external channels are configured to have a ratio of total internal channels area to total external channels area in the range between 0.5 and 3.0.

22. The method of claim 11, wherein the one or more internal channels and the one or more external channels are configured to have a ratio of total internal channels area to total external channels area in the range between 0.8 and 1.2.

23. A cyclical swing adsorption process for removing contaminants from gas feed streams comprising the steps of:
a) passing a gaseous feed stream through an adsorbent bed unit having an assembly of thermal polygon contactors to separate one or more contaminants from the gaseous feed stream to form a product stream, wherein the assembly of thermal polygon contactors have one or more internal channels within each of the thermal polygon contactors and one or more external channels formed between two or more of the thermal polygon contactors in the assembly of thermal polygon contactors, wherein at least one external surface for each of the thermal polygon contactors have an adsorbent coating; and wherein the adsorbent bed unit is configured to isolate direct fluid communication between fluids in the one or more internal channels and fluids in the one or more external channels;

b) interrupting the flow of the gaseous feed stream;

c) performing a depressurization step, wherein the depressurization step reduces the pressure within the adsorbent bed unit;

d) performing a purge step, wherein the purge step reduces the pressure within the adsorbent bed unit and wherein the purge step involves passing a purge stream to a through one or more of the external channels;

e) performing a re-pressurization step, wherein the re-pressurization step increases the pressure within the adsorbent bed unit ; and f) repeating the steps a) to e) for at least one additional cycle, wherein the gaseous feed stream and the purge stream are passed through the one or more external passages and one or more of the steps a) to e) are performed while a fluid is passed through the one or more internal channels to manage the temperature adsorbent coating during the respective step.

24. The method of claim 23, wherein the one or more internal channels and the one or more external channels are configured to have a ratio of total internal channels area to total external channels area in the range between 0.5 and 3.0.

25. The method of claim 23, herein the one or more internal channels and the one or more external channels are configured to have a ratio of total internal channels area to total external channels area in the range between 0.8 and 1.2.

* * * * *